United States Patent [19]
Morrison et al.

[11] Patent Number: 6,002,753
[45] Date of Patent: *Dec. 14, 1999

[54] METHOD AND APPARATUS FOR INTERFACING COMPUTERS TO EXCHANGE TELEPHONE CALL BUSINESS INFORMATION

[75] Inventors: David Morrison, San Jose; Gale Marinelli, Los Gatos; Barbara Chin, Santa Clara, all of Calif.

[73] Assignee: Siemens Business Communication Systems, Inc., Santa Clara

[*] Notice: This patent is subject to a terminal disclaimer.

[21] Appl. No.: 08/318,454

[22] Filed: Oct. 5, 1994

[51] Int. Cl.⁶ .......................... H04M 15/00; H04M 3/00; H04M 5/00
[52] U.S. Cl. .......................... 379/113; 379/133; 379/265; 395/201; 395/229
[58] Field of Search .................................... 379/112, 113, 379/114, 115, 130, 140, 265, 266, 133, 111, 201; 364/401; 395/201, 226, 227, 228, 229

[56] References Cited

U.S. PATENT DOCUMENTS

| | | | |
|---|---|---|---|
| 4,788,718 | 11/1988 | Meness et al. | 379/113 |
| 4,988,209 | 1/1991 | Davidon et al. | 379/113 X |
| 5,164,983 | 11/1992 | Brown et al. | 375/112 X |
| 5,289,368 | 2/1994 | Jordan et al. | 379/113 X |
| 5,299,260 | 3/1994 | Shaio | 379/265 |

FOREIGN PATENT DOCUMENTS

| | | |
|---|---|---|
| 0 568 770 A2 | 11/1993 | European Pat. Off. . |
| WO 84/01871 | 5/1984 | WIPO . |
| WO 92/09164 | 5/1992 | WIPO . |

Primary Examiner—Curtis Kuntz
Assistant Examiner—Paul Loomis

[57] ABSTRACT

An apparatus and method is provided for exchanging telephone call information between two computers, one of which is coupled to a computerized branch exchange (CBX) which services a plurality of telephone agents, the other of which contains telephone call statistics relating to the CBX. Business value records, each including information which relates a telephone agent to a business value datum such as a sales value from a telephone call, are generated in the first computer and transmitted to the second computer for storage into a database. Similarly, account code records, each including information which relates a telephone agent to an account code indicating the nature of a particular telephone call, are generated in the first computer and transmitted to the second computer. Call segment records, each including information relating to a particular telephone call segment, are also generated in the first computer and transmitted to the second computer. The second computer receives the transmitted business value, account code and call segment records, stores them into a database, and accumulates business value and account code value across a plurality of records according to a fixed time interval and one or more organizational hierarchies. A report generator is provided for generating useful reports from the accumulated values.

35 Claims, 25 Drawing Sheets

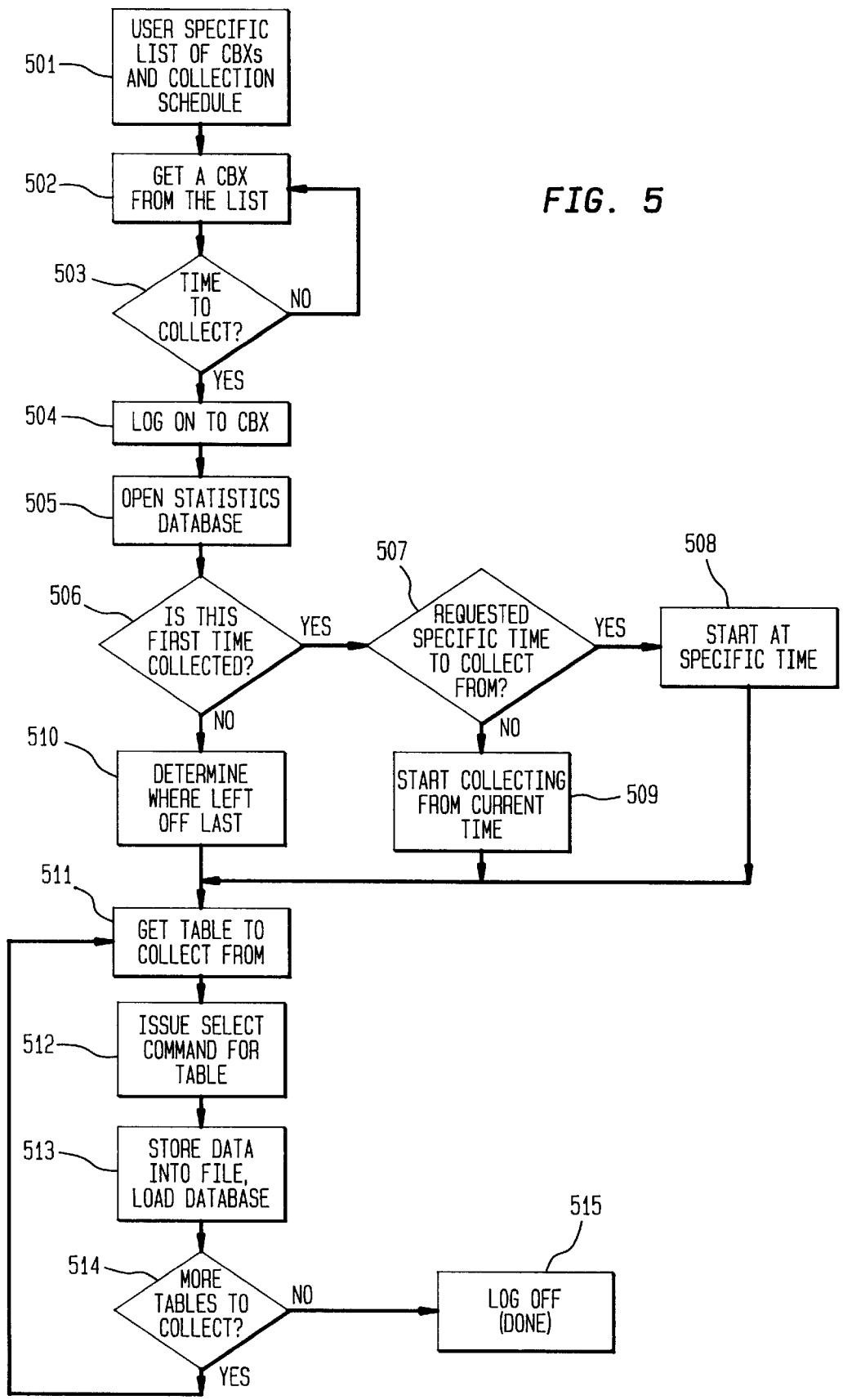

FIG. 6

Connectivity
* ACD/Switch

Host Name: Joy
Cbx Name: trek

Retrieve

Data Source Name: tty2
Switch Software Release: 9006.1
CCMS Version: UCCM5000.10.070
Time Zone: Pacific U.S.

Modify Sign-On

Statistical Retrieval Parameters ■ Enable
Days to Collect: All
Times to Collect: 12:00 m-12:00 m Configuration Retrieval Parameters ■ Enable
Auto Schedule
Day(s): All    Time: 2:00 am Retrieve Now Report  Clear Print Window    Apply    Reset    Quit    Help

Edit Setup Information for Section 1

◇ Organization ◆ Data Details ◇ Data Criteria ◇ Schedule Criteria

| | Total | Average | Highest | Data Element | Lowest | Data Element |
|---|---|---|---|---|---|---|
| Quarter Hour | ■ | ☐ | 0 ◁▷ | | 0 ◁▷ | |
| Half Hour | ☐ | ☐ | 0 ◁▷ | | 0 ◁▷ | |
| Hour | ☐ | ☐ | 0 ◁▷ | | 0 ◁▷ | |
| Session | ☐ | ☐ | 0 ◁▷ | | 0 ◁▷ | |
| Day | ☐ | ☐ | 0 ◁▷ | | 0 ◁▷ | |
| Week | ☐ | ☐ | 0 ◁▷ | | 0 ◁▷ | |
| Month | ☐ | ☐ | 0 ◁▷ | | 0 ◁▷ | |
| Year | ☐ | ☐ | 0 ◁▷ | | 0 ◁▷ | |

■ Total by Data/Time Range

[ OK ]   [ Cancel ]   [ Help ]

FIG. 20A

| Field Description | Field Name or Derivation | Size | Truncation Value |
|---|---|---|---|
| Type of Record | Record created by. C indicates call segment record | 2 | NA |
| Date | Host Date from Common Data area (for the first event of the call segment) | 9 | NA |
| Time | Host Time from Common Data area (for the first event of the call segment) | 7 | NA |
| Call ID Number | Unit of Work Application ID | 9 | NA |
|  | Unit of Work Index (need both to fully identify a call) | 13 | NA |
| Switch ID | Switch ID from the Message Related Data area | 9 | NA |
| Ending Condition | This flag indicates how the call was completed. The valid values are:<br><br>Blank. Call State not equal to D<br><br>The rest are valid only when Call State = D.<br><br>C-Complete. The call is done.<br>A-Abandoned. Agent ID is often blank.<br>J-Joined. (e.g. a transfer is completed)<br>D-Deleted. Deleted by housekeeping<br>L-Link Lost.<br>S-Shutdown. | 2 | BLANK |
| Maximum count of parties | Highest count that the party mix index reaches in this call segment. (If more then 2 was a conference) | 3 | ZERO |
| Customer number | Control Number (Customer must provide) | 31 | BLANK |
| Pilot number | Call_Routed, Call State=W, Party 2 Party number type = 3 (i.e. pilot), Party 2 Party number = the pilot number | 11 | BLANK |
| DNIS Number | DNIS | 33 | BLANK |
| ID if CICS application | The first Transaction ID or User mode Transaction ID (whichever was used) of the segment. | 9 | BLANK |
| Agent's ID | Agent ID from Call Related Data area | 11 | BLANK |
| Called party extension (i.e. the person or agent who is the server. The server is the party that controls the screen) | Call_Alerting, Call Parent = 0, Call State = C, Party 2 server = Y, Party 2 party number = the called extension.<br>Or<br>CAll_Transferred, Call Parent = 0, Call State = T, Party 2 Server = Y, Party 2 number = the called extension | 11 | BLANK |

FIG. 20B

| | | | |
|---|---|---|---|
| ANI Number | The last non-blank Client Number from the events for this segment. | 33 | BLANK |
| Number of Holds | Number of times the call was put on hold. This may include parking, etc for the client. (Count of times see Call State go to H.) | 3 | ZERO |
| Hold Time | Amount of time in seconds accumulated while call on hold for the client. (Time while Call State = H.) | 6 | ZERO |
| Queue Time | Amount of time in seconds call accumulated in the Queue before it reached this person for the client. (Time while Call State = W.) | 6 | ZERO |
| Connect Time | Amount of time in seconds call accumulated in the talk state for the client (includes such things as hold time). (Time while Call State = T.) | 6 | ZERO |
| Total Time | Amount of time in seconds from the beginning of this call segment to the end of this segment for the client. | 6 | ZERO |
| Transferred to Party type | The equipment type of the number that the party was transferred to.<br><br>Call_Transferred, Call Source = I, CAll Parentage = 0, Call State = T, Party 2 Party number type = the type.<br>Or<br>Call_Transferred, Call Source = I, Call Parentage = R, Call State = D, End Code = J, Party 2 Party number type = the type | 2 | BLANK |
| Transferred to Party number | The number of the party the call was transferred to.<br><br>Call_Transferred, Call Source = I, Call Parentage = 0, Call State = T, Party 2 Party number = the number.<br>Or<br>Call_Transferred, Call Source = I, Call Parentage = R, Call State = D, End Code = J, Party 2 Party number = the number. | 10 | BLANK |
| Total Size | | 232 | |

FIG. 21

| Field Description | Field Name | Size | Truncation Value |
|---|---|---|---|
| Type of Record | Record created by. B for Business Value Record. | 2 | NA |
| Date | Host Date when the record is written to the MIS log from Common Data Area | 9 | NA |
| Time | Host Time when the record is written to the MIS log from Common Data Area | 7 | NA |
| Call ID Number | Unit of Work application ID | 9 | NA |
|  | Unit of Work index | 13 | NA |
| Switch ID | Switch ID | 9 | NA |
| Customer number | Control Number | 31 | BLANK |
| Customer name | Customer Name or blank | 25 | BLANK |
| Agent's ID | Agent ID | 11 | BLANK * |
| Equipment Type | Agent party number type | 2 | BLANK |
| Number of person entering the business value | Agent's party number | 11 | BLANK |
| ID of CICS application | Transaction ID or User Mode Transaction ID (whichever was used.) | 9 | BLANK |
| Business value | The value of this transaction | 13 | NA |
| Business value sign | Indication of whether positive or negative. | 1 | NA |
| Total Size |  | 152 |  |

FIG. 22

| Field Description | Call Coordinator Field Name or Derivation | Size | Truncation Value |
|---|---|---|---|
| Type of Record | Record created by. A indicates generated account code record. | 2 | NA |
| Date | Host Date from Common Data area | 9 | NA |
| Time | Host Time from Common Data area | 7 | NA |
| Call ID Number | Unit of Work Application ID | 9 | NA |
| | Unit of Work Index (need both to fully identify a call.) | 13 | NA |
| Switch ID | Switch ID from Account Code Data area. | 9 | NA |
| Customer number | Control Number (Customer must provide) | 31 | BLANK |
| ID of CICS application | Transaction ID or User mode Transaction ID (whichever was used.) | 9 | BLANK |
| Agent's ID | Agent ID from Account Code Data area | 11 | BLANK |
| Agent's extension (i.e. the person or agent who entered the code.) | Party number from the Account Code Data Area. | 11 | BLANK |
| Account Code | Account code from the Account Code Data Area. | 32 | NA |
| Total Size | | 143 | |

METHOD AND APPARATUS FOR INTERFACING COMPUTERS TO EXCHANGE TELEPHONE CALL BUSINESS INFORMATION

This application is related in subject matter to copending U.S. application Ser. No. 08/315,317 entitled PBX DATA RETRIEVAL AND REPORTING SYSTEM AND METHOD naming the same inventors and having a common assignee.

BACKGROUND OF THE INVENTION

1. Field of the Invention

This invention relates generally to telephone private branch exchanges (PBXs) and, more particularly, to a system and method for exchanging "business" information relating to telephone calls between two computers which each receive information from one or more PBXs.

2. Related Information

Private Branch Exchanges (PBXs) are switching devices used by organizations with a need for internal telephone communication and for routing telephone calls from external telephone lines to internal telephones. A PBX may be connected to a switching office of the public telephone network, and multiple PBXs may be tied together to handle a large number of telephone lines.

As technology has improved, PBXs have become more sophisticated, employing computer circuits and data storage facilities to automatically route telephone calls to available agents, and to monitor call information such as the duration of each call. Such PBXs are sometimes called CBXs (Computerized Branch Exchanges) to distinguish them from less capable devices. As an example, these CBXs can be used in an airline reservation system employing dozens or even hundreds of airline reservation agents, whereby a CBX routes incoming calls made to a toll-free number to an available agent. Agents can "log on" to the CBX by entering their log-on ID from the telephone at which they will service incoming calls.

An example of a conventional CBX is the ROLM 9751 family of CBXS, including the models 30 and 80. These CBXs can automatically store information regarding where each call was routed (i.e., which phone line), the duration of each call, the length of time required before the call was answered, and the like. This information, which is stored and accumulated in the CBX over a predetermined time period (such as every 15 minutes), can be retrieved and monitored by supervisors using preformatted data reports. Based on the preformatted data reports, the supervisors can make personnel changes due to changes in the incoming telephone call load.

FIG. 1(a) shows a conventional configuration for combining telephone call information with caller records and a business database. In FIG. 1(a), a first agent 06 operates a first telephone 04 and a first computer terminal 08 to handle incoming telephone calls such as airline reservations or catalog orders. The first telephone 04 is coupled to a first CBX 02, which is in turn coupled to a computer 01 such as an IBM mainframe of various models. First terminal 08 is also coupled to mainframe computer 01 through a record display generator 12 and a data entry program 13. Similar couplings are provided for a second agent 07 with a second telephone 05, a second CBX 03, and a second computer terminal 09. CBX 02 may optionally have a PC 15 coupled thereto for collecting and displaying certain statistics information retained by the CBX, such as the average time spent talking per agent. CBX 03 may also have its own PC 16 connected thereto for the same purpose.

In operation, incoming telephone calls are routed to telephone 04 by CBX 02. When a telephone call comes in and as the call progresses, various "call event" messages are automatically transmitted by CBX 02 to computer 01. A call event may include specific information such as the caller's telephone number, who answered the call, or the like. Call events (such as new calls, call transfers, call hang-ups, etc.) arrive in mainframe computer 01 into event handler 17, which logs the events into event log 18 and routes new call events to a caller look-up function 10, which searches caller database 11 for corresponding information on the caller (such as the caller's account information, latest transaction, medical records, etc.). Upon retrieval from caller database 11, caller look-up function 10 transfers the caller's information to record display generator 12, which generates display information and transmits it to terminal 08 for viewing by agent 06. Thus, the agent can speak to the caller on telephone 04 and have immediately displayed on terminal 08 specific known information regarding the caller. If the caller is placing a catalog order or requesting other services from the agent, the agent 06 can enter such information on terminal 08 through data entry program 13. The new information provided by the caller (such as a catalog order with credit card information) is stored into a business database 14. If caller database 11 does not contain any prior information on the caller (such as the caller's address or social security number), new information may be stored into caller database 11 based on information provided by the caller. The components on the right hand side of FIG. 1(a) operate similarly to those on the left, with a different agent 07.

The conventional arrangement shown in FIG. 1(a) makes it difficult to correlate sales and other business information stored in business database 14 with performance statistics for each agent or group of agents. For example, it is difficult to correlate the average amount of time spent on the telephone by a group of agents with the amount of business generated by the group, because the mainframe's call event information does not include information regarding such groups. There is no mechanism for correlating the numerous other statistics maintained in CBXs 02 and 03 with the business information maintained on mainframe computer 01 or with other organizational information.

For example, it would be desirable to automatically identify the average sales volume generated by a particular catalog department to which a group of agents belongs, or the average number of insurance policies sold for a particular agent during a particular period of time. Even if certain statistics which are stored in each CBX (such as average length of time spent per call per agent) were directly transmitted from each CBX to mainframe computer 01, problems would arise with respect to multiple log-on identifiers per agent, agents moving between CBXs, agents belonging to different organizational hierarchies, and statistics kept across groups of agents. Additionally, mainframe computer 01 could become bogged down with additional data collection and storage tasks, slowing down the other applications running on it. PCs 15 and 16 already provide a certain degree of CBX statistics information locally, and replicating such functions in mainframe computer 01 would be wasteful and possibly duplicative. In short, the arrangement shown in FIG. 1(a) does not allow for easy correlation of the desired information.

In summary, there has been an unsatisfied need to combine "business" related information normally stored on one computer with telephone calling statistics accumulated from one or more CBXs in order to generate reports which cross-reference the collected information. For example, it would be desirable to correlate the average amount of time spent on the telephone for a particular sales agent with the amount of products sold by the agent, and because these two types of information are typically kept in separate computers and organized substantially differently, this has heretofore been difficult.

SUMMARY OF THE INVENTION

In order to satisfy the aforementioned needs, the present invention contemplates a system and method for interfacing a first computer coupled to one or more CBXs with a second computer which may also be coupled to the same one or more CBXs, wherein the first computer stores "business value" information relating to particular agent transactions, and wherein the second-computer automatically collects from the one or more CBXs telephone calling statistics and generates useful reports therefrom. In accordance with various embodiments of the invention, various pieces of "business value" information are transmitted over a link from the first computer to the second computer, where the data is accumulated and stored with related information collected from the CBXs. Thereafter, user-customized data reports may be generated which allow the combined data to be correlated.

BRIEF DESCRIPTION OF THE DRAWINGS

Various objects, features, and attendant advantages of the present invention can be more fully appreciated as the same become better understood with reference to the following detailed description of the present invention when considered in connection with the accompanying drawings, in which:

FIG. 5 is a flow chart showing an example of how telephone calling data may be collected from multiple CBXs in accordance with embodiments of the present invention.

FIG. 6 shows one possible screen layout for allowing a user to enter a collection schedule in accordance with embodiments of the present invention.

FIG. 10 illustrates one example of a computer screen which may be used to enter employee information in accordance with embodiments of the present invention.

FIG. 17 shows an example of a screen layout for specifying data details in a report, including a time interval for each row of the report in accordance with embodiments of the present invention.

FIG. 20 shows one possible record format for transmitting call segment information from computer 1901 to computer 1927 of FIG. 19.

FIG. 21 shows one possible record format for transmitting business value information from computer 1901 to computer 1927 of FIG. 19.

FIG. 22 shows one possible record format for transmitting account code information from computer 1901 to computer 1927 of FIG. 19.

DETAILED DESCRIPTION

Figure 18:
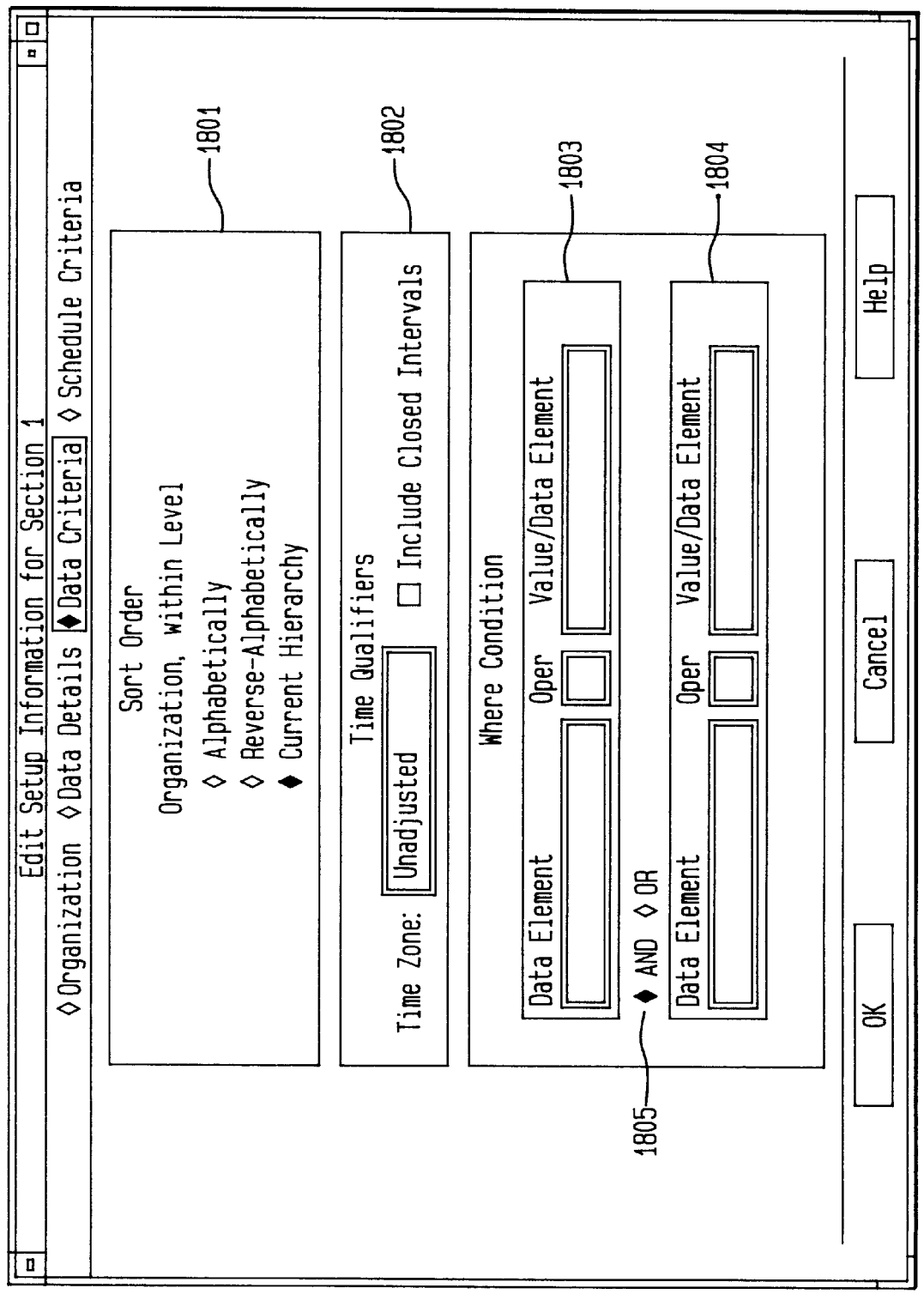
FIG. 18 shows an example of a screen layout for specifying data criteria in a report in accordance with embodiments of the present invention.
Figure 19A:
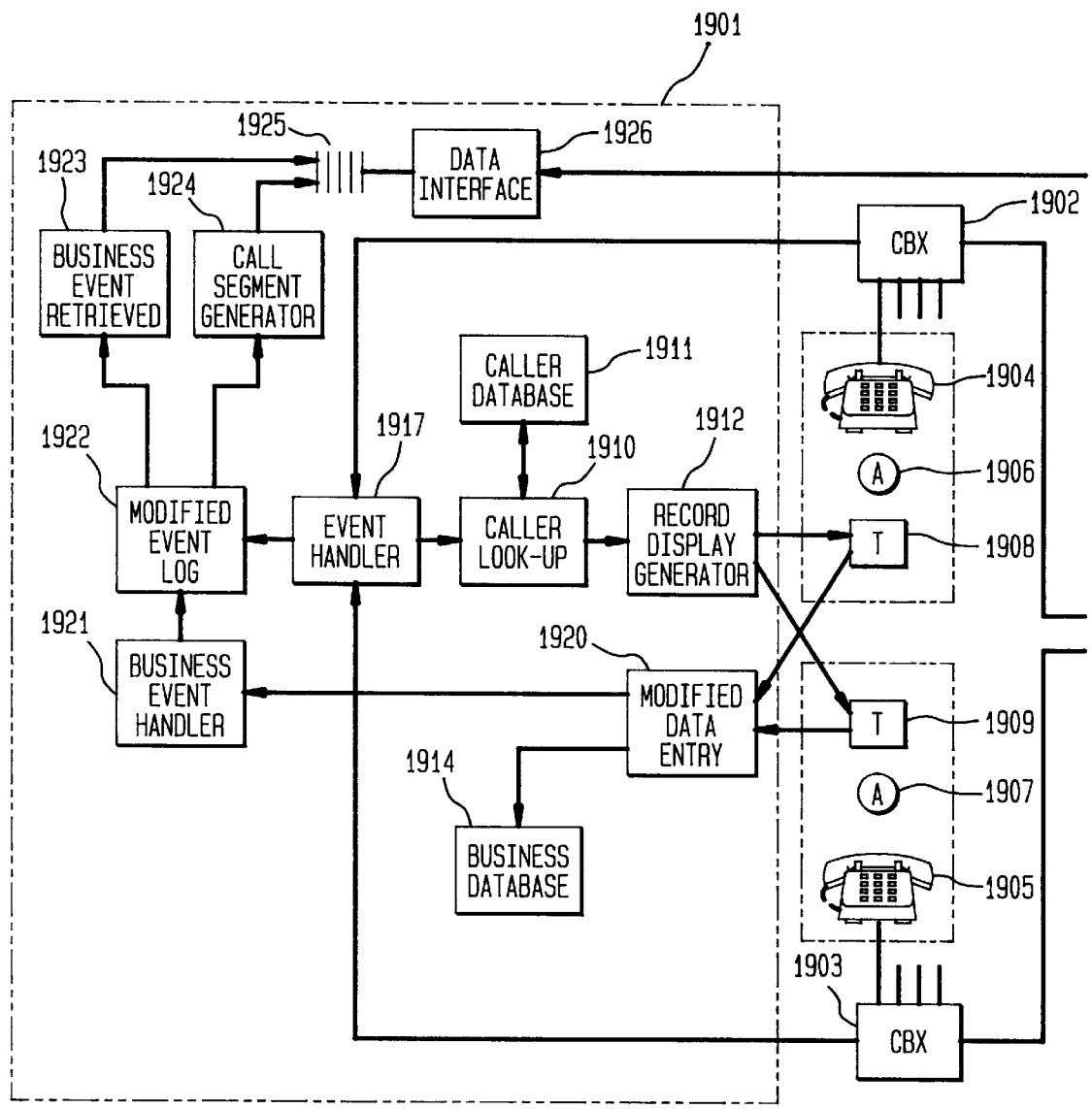
FIG. 19 shows how the principles of the present invention may be implemented in order to interface a first computer with a second computer, wherein the first and second computers separately interface to one or more CBXs.
Figure 19B:
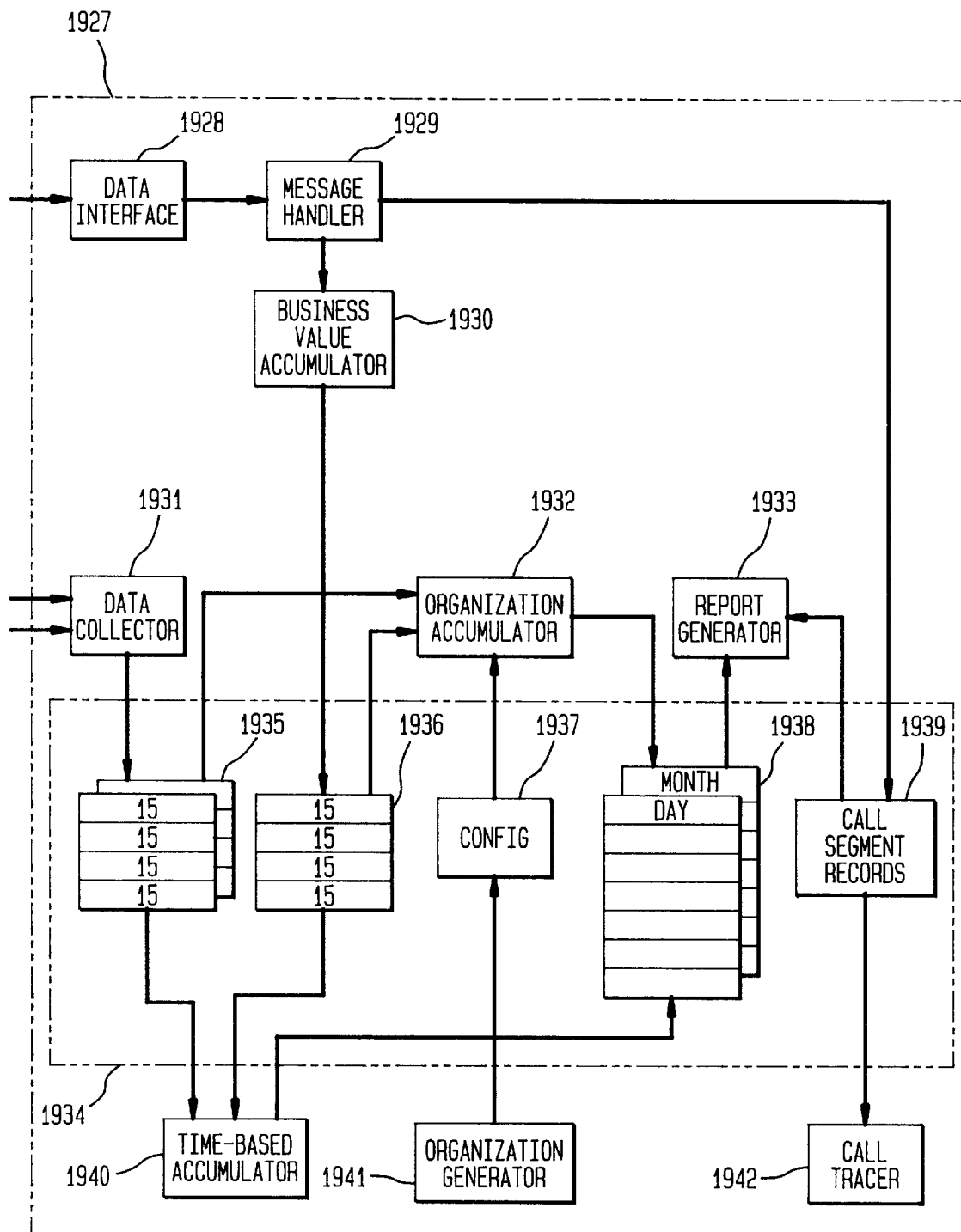

The present invention provides an interfacing method and apparatus an example of which is shown in simplified form in FIG. 19. However, in order to fully appreciate the scope of the present invention, it is necessary to describe in more detail how data may be collected from various CBXs, accumulated in useful ways, and how reports may be generated therefrom. In this regard, the following Section I (and FIGS. 1(b) through 18) provides such detail.

I. DATA COLLECTION AND REPORTING FROM CBXs

Figure 1A:
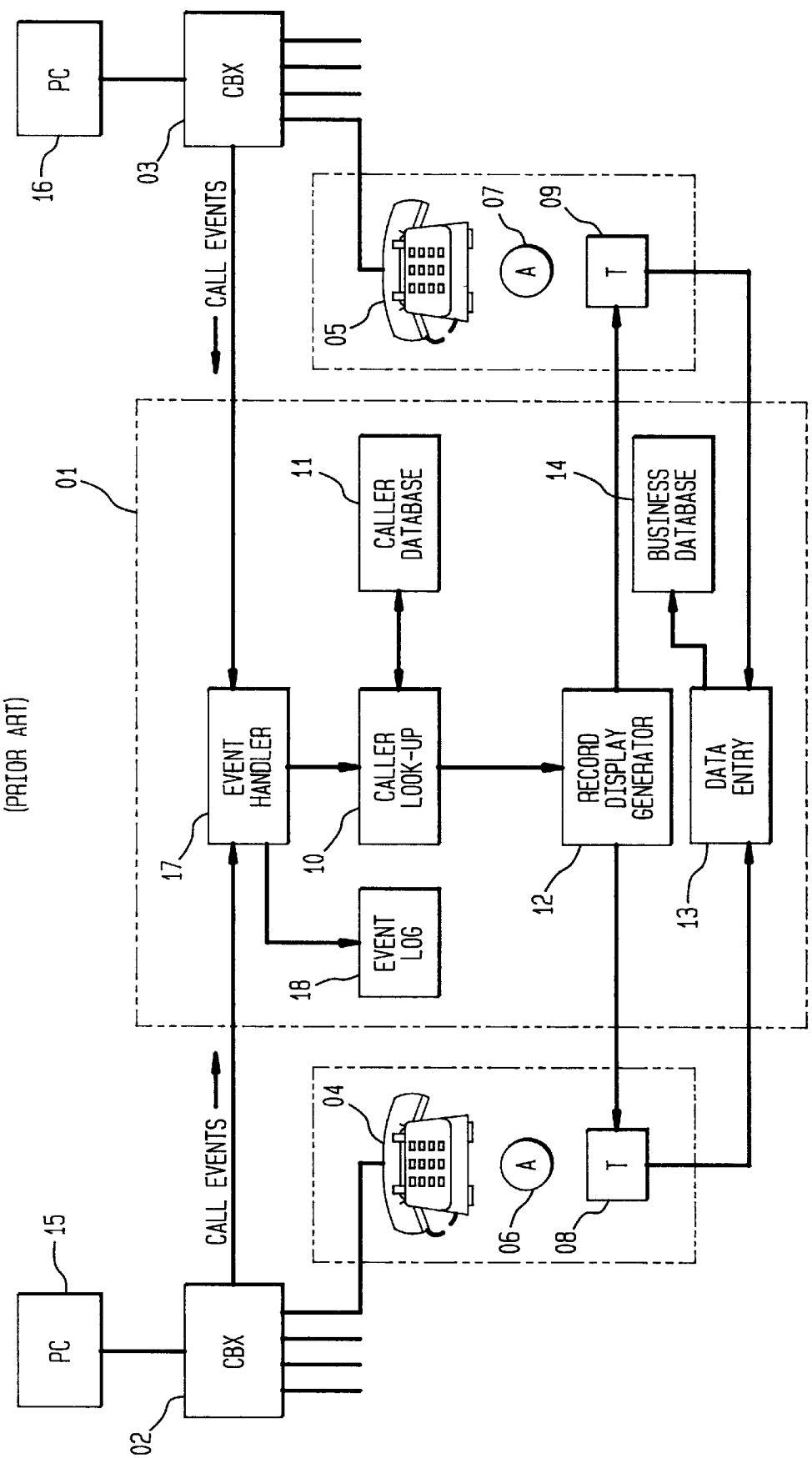
FIG. 1(a) shows a simplified view of a conventional configuration in which a mainframe computer is interfaced with one or more CBXs.
Figure 1B:
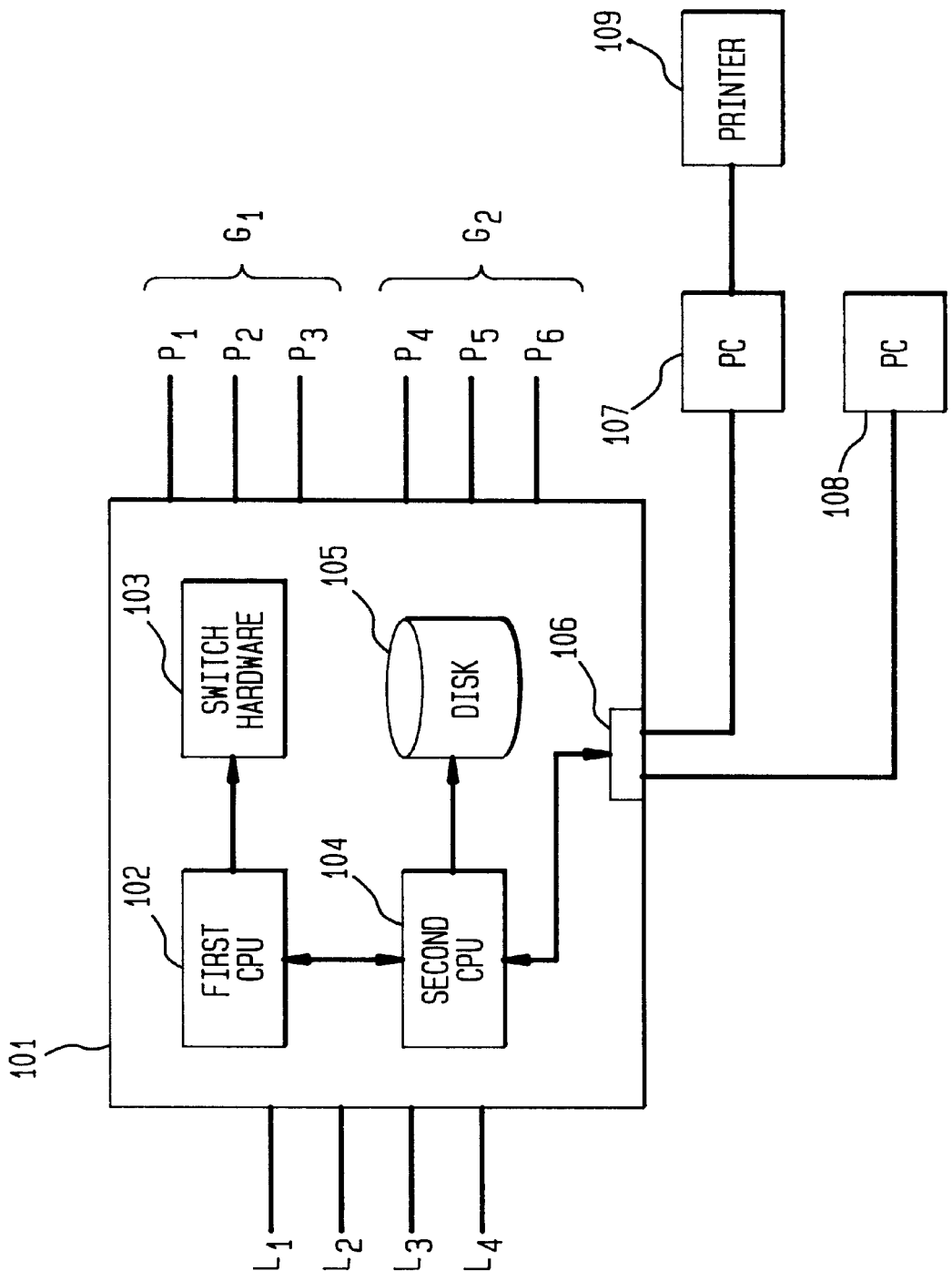
FIG. 1(b) shows a simplified view of a conventional CBX configuration.

FIG. 1(b) depicts in simplified form a conventional CBX configuration which may comprise a ROLM 9751 family device, for example. The CBX 101 includes means for accepting a plurality of input lines L1 to L4 and for servicing a plurality of telephones P1 to P6 connected thereto, grouped into two groups G1 and G2 for purposes of automatic call distribution. Although FIG. 1(b) shows only a few telephone lines for the purposes of illustration, it will be appreciated that dozens of such telephone lines may be handled by a single CBX. CBX 101 comprises a first CPU 102 for controlling switching hardware 103 to accept telephone calls from the incoming lines and route each call to an appropriate telephone line based on well known criteria such as selecting the first available line in a group.

First CPU 102 is coupled to and communicates with second CPU 104 for the purpose of transferring call information, such as the starting and ending time of each call. CPU 104 collects such call information on a call-by-call basis, accumulates certain of the information (such as total talk time for all calls in a time period) and stores it on disk 105 for later retrieval. CBX 101 is also coupled to a plurality of PCs 107 and 108 through serial ports 106. At least one PC may be coupled to a printer 109 for printing various reports displayed on the PC. Additionally, printers may be directly connected to a serial port such as element 106.

Both CPU 102 and CPU 104 may comprise any suitable microprocessor and any suitable operating system. In various embodiments, an Intel family microprocessor such as the 80486 may be used, and SCO UNIX may be used for the operating system.

During operation, human supervisors operate each PC 107 and 108 to monitor the call information collected by CPU 104, such as total number of calls per unit of time, total number of calls per group of telephones, and the like. The supervisors enter commands from each PC which are transmitted through serial ports 106 to CPU 104, and a computer program on second CPU 104 (not shown) retrieves call information from its memory and/or disk 105 and transmits pre-formatted data to the requesting PC for display. Data may be stored on disk 105 for several days and is typically deleted automatically on a "rolling" time basis.

OVERVIEW OF OPERATION

Figure 2:
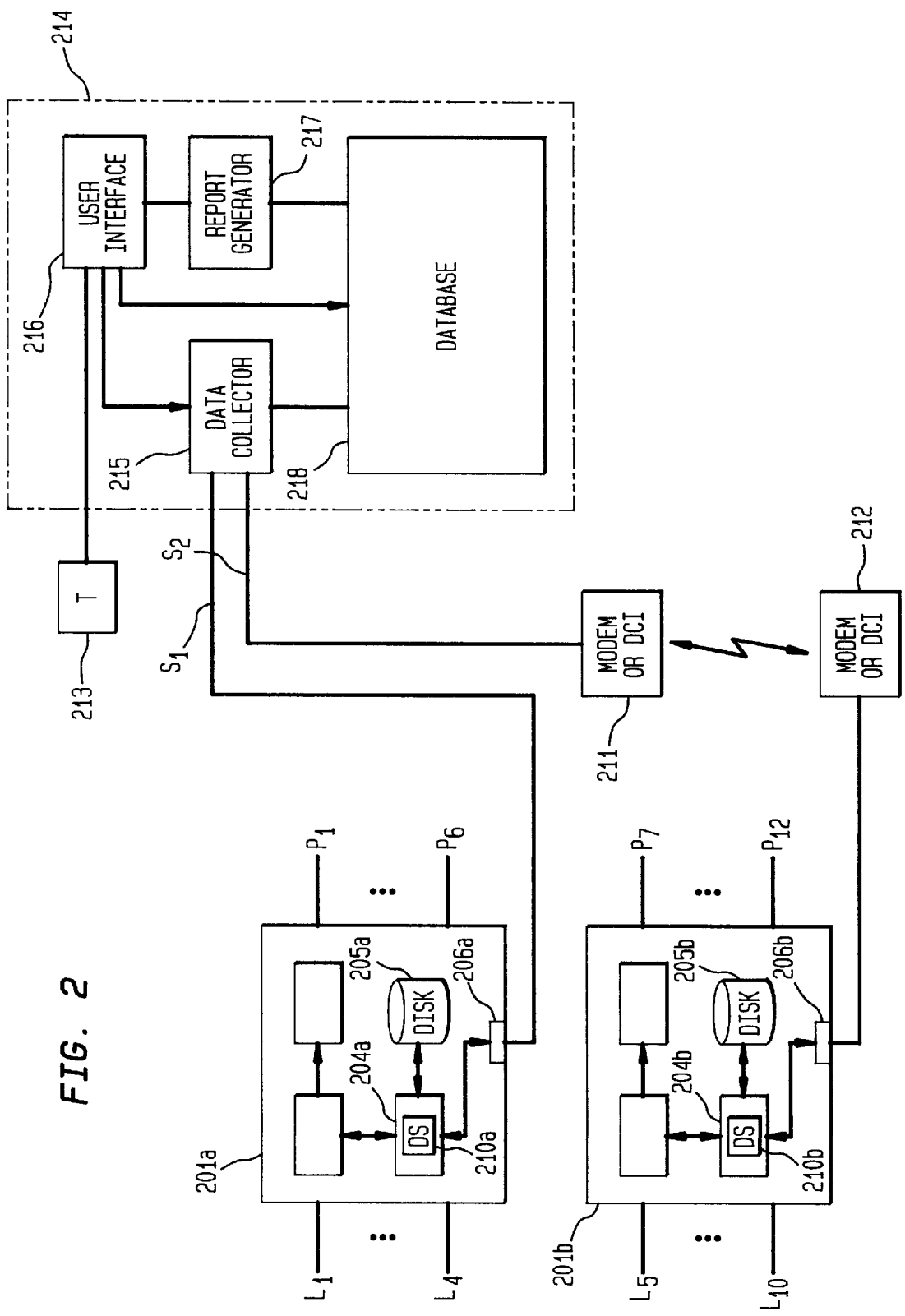
FIG. 2 shows in block diagram form components employing various principles of the present invention.

FIG. 2 illustrates an example configuration employing various principles of the present invention. A first CBX 201*a* and a second CBX 201*b* are similar to CBX 101 shown in FIG. 1. A difference, however, is the addition of software modules 210*a* and 210*b*, which act as data servers for servicing commands generated from collection computer 214 as explained in more detail below. Each CBX is coupled to collection computer 214 (which may, for example, comprise an IBM RS/6000 RISC processor) through serial lines S1 and S2 respectively. First CBX 201*a* is connected directly to collection computer 214 through serial port 206*a*, while second CBX 201*b* is connected by way of modems 211 and 212 and ultimately through serial port 206*b*, wherein second CBX 201*b* may be located at a different physical site from first CBX 201*a*. In various embodiments, a data transfer rate of 19.2 Kbaud may be used for direct connections between a CBX and collection computer 214, while for modem connections, a rate of 9600 baud may be employed. While only two CBXs (i.e., 201*a* and 201*b*) are shown in FIG. 2, it will be appreciated that more than two CBXs may be connected to collection computer 214 either directly or through modems. Additionally, CBXs may be connected to collection computer 214 through virtually any communication schemes including line drivers, local data lines, data communication interfaces (DCIs), local area networks, wide area networks, or the like.

PCs such as PCs 107 and 108 illustrated in FIG. 1 may also be connected to first CBX 201*a* and second 201*b* of FIG. 2.

Collection computer 214 comprises, in various embodiments, data collector 215, user interface 216, report generator 217, and database 218. A user terminal T is coupled to user interface 216 in order to allow a user to control the apparatus. Data servers 210*a* and 210*b* (shown within CBXs 201*a* and 201*b*) interact with data collector 215 in a manner described below.

Data collector 215 gathers statistics and configuration information from one or more CBXs on a periodic basis according to a user-defined schedule. Once the user has set up a collection schedule, no further user intervention is required. In summary, data collector 215 "logs in" to each CBX and collects statistics for a particular time period. Each data server 210 extracts information requested by data collector 215 from its database (stored on disk 205) and transmits it to data collector 215 using a communications package such as the well-known Zmodem protocol. In various embodiments, each CPU 204*a* and 204*b* is configured to include a UNIX username and password which allows data collector 215 to "log-in" to the operating system.

In order to carry out data collection from each CBX, data collector 215 may issue various commands to each CBX and receive responses therefrom. In various embodiments, commands may be provided for the following operations:

schema command: requests information regarding the database schema for the particular CBX.

system information command: requests information regarding the CBX system configuration.

open database command: requests that the CBX open a particular database for access.

destination file command: notifies the CBX of the file name into which received data should be stored.

olddate command: requests the date/time of the oldest entry in any table in the statistics database stored in the CBX.

select command: requests data from a particular database table which satisfies a specified selection criteria.

log-on/log-off command: used by data collector 215 to log onto or off of the CBX data server.

The operation of the above commands will be described in the context of the operation of data collection between data collector 215 and each data server 210. It will be appreciated that the principles of the present invention may be carried out using commands or message exchanges other than those specifically described above.

Except for the transmission of database data via Zmodem (which incorporates its own error checking procedures), the command response exchange between data collector 215 and each CBX need not utilize a checksum or other error detection mechanism over the link, but may instead detect errors by using the full duplex echo from each data server 210 to check each character as it is sent. When data collector 215 detects that a character has been corrupted, it sends a control-U character to the particular data server to cancel the line, and then resends the command. Data collector 215 sends no more than one outstanding command at a time for any single CBX.

Calling statistics stored on each disk 205*a* and 205*b* may be stored in a relational database such as INFORMIX™, and database 218 on collection computer 214 may also comprise a relational database, preferably of the same type as the one on each CBX for compatibility reasons. In operation, each CBX independently collects and stores telephone calling information for telephone lines serviced by that CBX. In accordance with a user-defined schedule, data collector 215 collects intervals of stored data from each CBX data server 210 and incorporates the collected data into database 218 on collection computer 214 for use in generating reports based on additional information stored in database 218. Data servers 210a and 210b receive incoming database commands from computer 216 and pass them to their own databases which may be stored on disks 205a and 205b, respectively. When database results are returned from the statistics databases located on disks 205a and 205b, data servers 210a and 210b pass the results via a communication package such as Zmodem back to collection computer 216.

DATABASE CONFIGURATION

Figure 3:
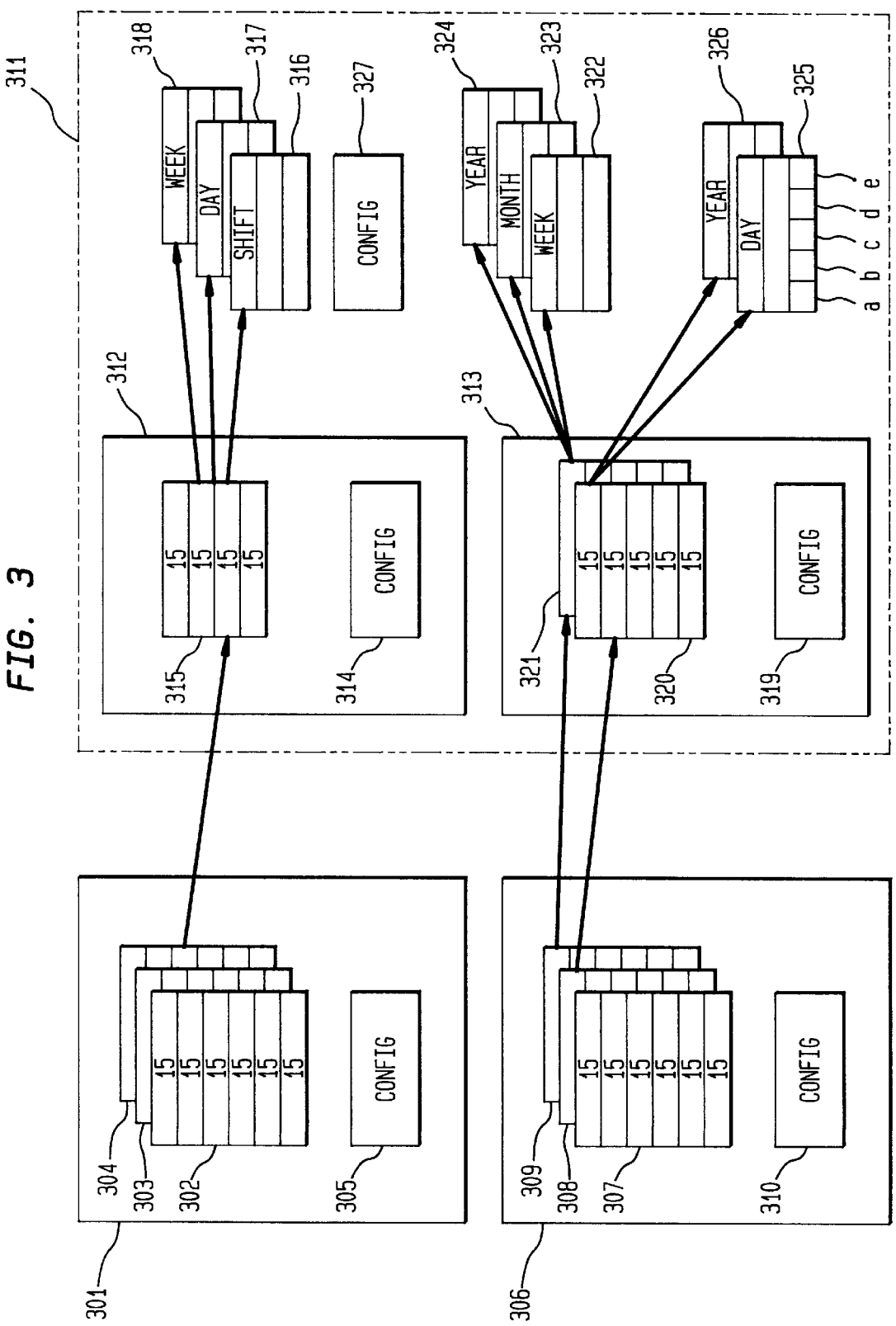
FIG. 3 shows an example of how databases may be organized between two CBXs and a main computer in accordance with embodiments of the present invention.

The various databases stored on each CBX 201a and 201b and on collection computer 214 will now be described with reference to FIG. 3. In FIG. 3, database 301 stores telephone data accumulated within CBX 201a of FIG. 2, while database 306 stores telephone data accumulated within CBX 201b of FIG. 2. Each database 301 and 306 may be respectively stored on disks 205a and 205b of CBXs 201a and 201b. In various embodiments, each CBX database includes a configuration database and a statistics database which may comprise multiple tables. For example, database 301 includes configuration database 305 and statistics tables 302, 303, and 304. Each statistics table comprises a plurality of records, each record containing telephone calling information collected over a predetermined time period (for example, 15 minutes as illustrated in FIG. 3). The tables may be configured in various ways as needed, and it may of course be possible to store all information in a single table in certain applications.

Similarly, database 306 (on CBX 201b) comprises its own configuration database 310 and statistics tables 307, 308, and 309. Each of these statistics tables comprise a plurality of records containing telephone calling information collected over a predetermined time period, such as 15 minutes. All of the tables on any one CBX may be stored in the same relational database, such as INFORMIX™.

Generally speaking, each configuration database may include information regarding group names, agent names and identifiers, assignments of agents to groups, queuing methods used for each group, and the like. This information generally relates switching hardware within the CBX to other entities such as agents, trunk groups, service levels per group of agents, and the like.

Each statistics table comprises information regarding telephone calling statistics for the CBX on which the table resides. With reference to database 301, statistics table 302 may include records which accumulate information for each group of telephone lines. Thus, each record in table 302 may contain information such as:

total number of telephone calls per 15-minute interval for a particular group or groups of phone lines
total number of telephone calls which were abandoned for a particular group or groups of phone lines.

A second statistics table 303 may include records which accumulate information for each agent connected to the CBX, such as:

total amount of time spent on calls per agent per 15-minute interval
total time spent on off-network calls per 15-minute interval.

Yet a third statistics table 304 may include records which accumulate information for each trunk group, such as:

total number of incoming calls per trunk line per 15-minute interval
total unanswered calls per trunk line per 15-minute interval.

Similar tables are maintained in database 306, but relating to second CBX 201b.

The statistics tables in databases 301 and 306 are updated at regular intervals by CPUs 204a and 204b, respectively, such that data is accumulated in each CBX. After a predetermined period of time (such as 14 or 42 days), the oldest data may be automatically deleted on a "rolling" basis in order to retain storage space in the CBX.

In accordance with the data collection principles of the present invention, selected information from databases 301 and 302 may be retrieved and transmitted to database 311, which resides on collection computer 214 shown in FIG. 2 (database 311 of FIG. 3 is thus a subset of database 218 of FIG. 2). As illustrated in FIG. 3, a portion of statistics table 304 from database 301 (i.e., from CBX 201a) has been retrieved into table 315 in database 312 (part of database 311) after a series of scheduled data collection transactions. That is, as data accumulates in database 301, portions of the accumulated data may be automatically and selectively copied into a statistics table in database 312 having the same fields, but the number of records may be different, corresponding to a different length of time for accumulated data.

The data which is selectively retrieved into database 311 may not be optimally structured for reporting in a desirable manner. Accordingly, database 311 contains additional statistics tables 316, 317 and 318 comprising records which accumulate longer time periods than those included in the records of table 315. For example, table 316 accumulates information on the basis of a "shift" (such as an 8-hour shift) using the information contained in table 315. That is, after each data collection session, the information in a plurality of records from table 315 is accumulated and stored as a record in table 316. Similarly, the data accumulated over an entire day may be stored in a record in table 317, and data accumulated over an entire week may be stored in a record in table 318. In this manner, data is instantly available over a variety of time periods in database 311 and for generally longer periods of time than may be stored in each CBX.

Similarly, data from two statistics tables from database 306 have been selectively and automatically copied into database 313 (part of database 311) as illustrated in the bottom portion of FIG. 3. Data from table 309 has been copied into table 321, and data from table 308 has been copied into table 320. Moreover, data from table 321 has been accumulated into tables 322, 323 and 324 (weekly, monthly and yearly), while data from table 320 has been accumulated into tables 325 and 326 (daily and yearly accumulations). Thus, for each statistics table in database 313, one or more additional database tables may exist in database 311 which accumulate the various fields and records over a different time interval. As shown in table 325, each record may comprise a plurality of fields (a through e) each of which holds information on a particular statistic (e.g., total number of calls per group, average time spent waiting per agent, etc.). Although FIG. 3 shows different accumulation patterns between data from CBX 201a (database 312) and CBX 201b (database 313), in various embodiments it may be more suitable to use identical accumulation patterns for each CBX (i.e., keep shift, day, week, month, year accumulation tables for each CBX) in order to promote uniformity and ease of reporting. Thus, it should be understood that the difference in table configurations between databases 312 and 313 is shown only as an example.

Configuration databases 305 and 310 are also copied into database 311 (as databases 314 and 319, respectively), but these databases generally only need to be copied infrequently (such as once per day or less) because the configuration information changes less frequently. Moreover, a separate configuration database 327 is stored in database 311 for reasons which will become apparent. Among other things, this separate configuration database includes information which identifies the organizational hierarchy used to accumulate information in a hierarchical manner. Although the configuration databases are shown as being stored separately, it is of course within the scope of the present invention to store all such configuration information into the same physical database with appropriate record identifiers to segregate the information as needed. The same principle applies to the statistics tables.

SCHEMAS AND SCHEMA COMPATIBILITY

Each CBX may have a potentially different database schema according to which data is stored. (Generally speaking, a schema is the definition of fields and data types which are stored in each record, and the organization of records into tables in the database.)

The present invention contemplates the collection of data from different CBXs having potentially different database schemas, as will now be described in more detail. Once a set of fields has been defined for a particular database table in a CBX, any new fields added to the database table should be added to the end of the record. This allows data collector 215 to ignore these extra fields if they are not supported on the data collector database.

Figure 4:
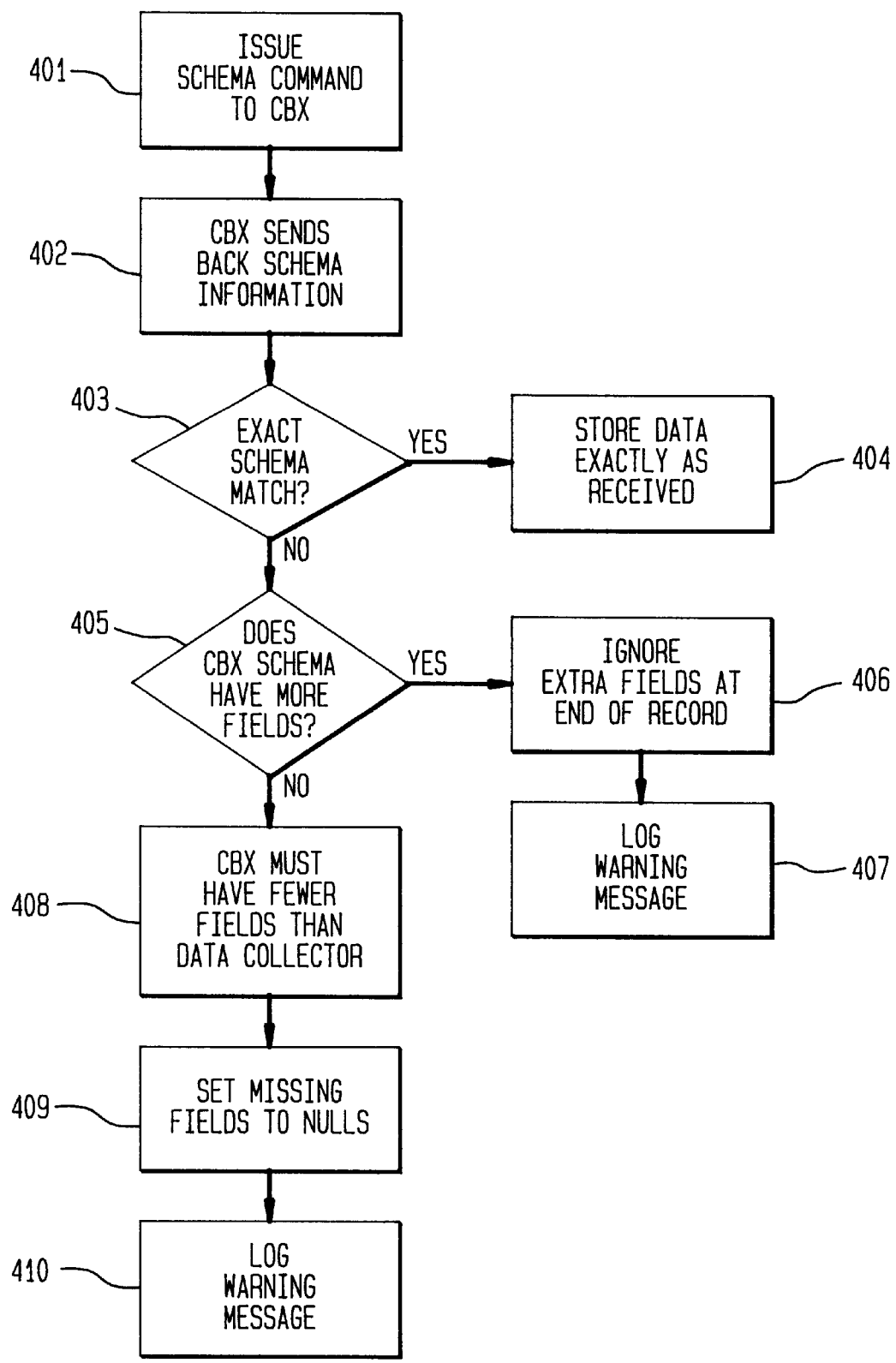
FIG. 4 is a flow chart showing an example of how database schema information may be collected from different CBXs in accordance with embodiments of the present invention.

FIG. 4 provides a flow chart for the operation of data collector 215 with respect to identifying schema compatibility between databases 301 and 306 retained on each CBX (e.g., 201a and 201b) and database 311 stored in collection computer 214. When data collector 215 "logs on" to each CBX for the first time, it issues a schema command (step 401) to obtain information about the database tables stored in the CBX. The CBX to which the command is directed sends back schema information (step 402) as described below.

The schema command may specify a database name and a table name. The schema command opens the specified database to retrieve information about a database table. When the command is successfully executed, each CBX (by way of data servers 210a and 210b) will preferably return the following-schema information:

1. database, table name
2. version, number of fields
3. fldname1, fldname2, . . . , fldnamen
4. fldtype1, fldtype2, . . . , fldtypen
5. fldlen1, fldlen2, . . . fldlenn The above fields are defined as follows:

database: the name of the database (e.g., configuration or statistics)

table name: the name of the table requested in the specified database version: the version number of the database schema. This version number is the same for all tables in a particular database. Whenever the database schema changes, the version number changes as well.

number of fields: the number of fields in the database table (i.e., the number of columns).

fldname: the names of the fields in the specified database table, listed in the order in which they are stored in the table.

fldtype: the data type of each field listed in the preceding line; preferably corresponds to a data type in the published database specification.

fldlen: the length in bytes of each field.

Referring again to FIG. 4, in step 403 data collector 215 makes a determination as to whether there is an exact schema match between database 311 and the database on the CBX to which the schema command was directed. A match may be initially determined on the basis of a comparison between version numbers in the CBX database and database 311, and further by a detailed comparison of the schema definitions received from the CBX with those stored in database 311 (i.e., table-by-table, field-by-field comparison). If the schemas match exactly, data collector 215 will henceforth store an exact copy of the data received from the particular CBX into database 311 (step 404).

If the schemas do not match exactly, data collector 215 makes a determination in step 405 as to whether the schema on the requested CBX database ("CBX schema") has more fields than those in database 311. If the particular CBX schema has more fields than those in database 311, data collector 215 will henceforth ignore the extra fields at the end of each record received from the CBX, but sets a flag indicating that the truncated record should be added to database 311 (step 406) and logs a warning message as to the ignored data (step 407).

If the schemas do not match exactly and the CBX schema does not have more fields than database 311, then in step 408 it is established that the CBX schema has fewer fields than are in database 311. In this situation, data collector 215 will henceforth set the "missing" fields from the CBX to nulls in database 311 (step 409) and log a warning message as to the nulled fields in database 311 (step 410).

Data collector 215 may also issue -a request for system information from each CBX. In response to this request, the selected CBX returns the following information in various embodiments:

current date/time version number of the statistics database schema version number of the configuration database schema version number of the data server computer program The above described operation allows data collector 215 to operate with different database versions across different CBXs. This feature is particularly useful in the case where different CBXs are upgraded gradually rather than as a group, and allows incremental changes to databases across CBXs. The above operation can be easily extended to determining whether a particular order of fields in a database table has occurred on a particular CBX.

Data collector 215 may obtain statistics and configuration information in a single data collection session, or may obtain only one or the other in a single log-on session.

THE DATA COLLECTION PROCESS

The data collection process for statistics data will now be described with reference to FIG. 5, assuming that the process shown in FIG. 4 (or the like) has already been completed in order to determine the degree of schema compatibility between the database in each CBX and database 311. In step 501, the user specifies a list of CBXs from which data is to be collected, and a collection schedule for the same. A user screen such as that shown in FIG. 6 may be used, with user interaction provided by user interface 216 of FIG. 2. As can be seen in FIG. 6, the invention contemplates allowing the user to select separate collection schedules for each CBX and for each database in each CBX (i.e., statistics database and a configuration database) In various embodiments, the user interface may be implemented according to the X Window™/Motif™ graphical user interface standards. Although not shown in FIG. 6, the user may also specify a starting date and time before which data will not be collected; in other words, if a particular CBX has historical data from the past 42 days, the user can specify a starting date and time which will avoid collection of undesired "old" data. This user-specified time may be used as shown in step 507 of FIG. 5 to determine time parameters for a SELECT command.

At step 502, data collector 215 retrieves the first CBX from the list of CBXs specified by the user, and in step 503 determines whether, based on the current time, it is time to collect data for this CBX. If so, data collector 215 attempts to log onto the selected CBX (step 504), but otherwise the next CBX is retrieved from the list in step 502.

In step 505, data collector 215 opens the statistics database by issuing an "open database" command to the data server on the CBX. In step 506, it is determined whether this is the first time that statistics have been collected from this CBX. If this is the first time data collection has been done for this CBX, then all of its data may potentially need to be collected, and in step 507 it is determined whether the user specified a specific starting date/time for the data (that is, a time before which data already stored in the CBX will be ignored). If such a time was specified, then in step 508 the specified date/time is used to formulate a time interval for database retrieval. If no specific time was selected by the user, then in step 509 it is determined that data collection will proceed from the present time forward, and this fact is used in formulating a time interval for database retrieval. Finally, if in step 506 it is determined that this was not the first time that data was collected for this CBX, then in step 510 it is determined (by reference to internally stored flags) where the data collection process for this CBX last left off.

In step 511, a table is selected from which data will be collected using the time interval determined from either step 510, 509 or 508. In various embodiments, a list of tables from which data is to be collected may be stored in database 311. In step 512, a SELECT command is generated and issued for the target table over the specified time interval. In various embodiments, a maximum amount of time span (for example, 1 hour) may be fixed to limit the amount of data which will be retrieved by any particular SELECT statement. Time intervals which exceed this span will be broken up into smaller intervals limited to the maximum, and data collection will proceed for these smaller intervals until all the data has been collected for the larger interval.

In step 513, after data from the specified table is returned to collection computer 214, the returned data is stored into a file, and the file is loaded into database 311 in the appropriate statistics table, taking into account any schema differences (e.g., padding or nulling fields in the records). In step 514, it is determined whether there are more tables in the designated CBX from which to collect data. If so, processing resumes at step 511, and if not, in step 515 a log-off command is issued to the CBX and the process terminates.

For each table from which data is to be retrieved, data collector 215 sends a file name into which the table data will be received, sends a SELECT statement to the data server to request the data from the database table, and starts up Zmodem to receive the data from the CBX and store it in a destination file on collection computer 214.

The process illustrated in FIG. 5 is repeated for the duration of the data collection schedule specified by the user. A default collection interval such as 15 minutes may be used.

FORMAT OF SELECT COMMANDS AND DATA RECORDS

Each SELECT statement obtains data from a specific database table. A sample format is shown below:

SELECT * from <table_name>
  where d_time between datetime (YY-MM-DD HH:MM) and datetime (YY-MM-DD HH:MM)
[this selects all records from table_name for a particular time interval]
SELECT * from <table_name>
[this selects all records from table_name] One of ordinary skill in the art will recognize the above as various types of SQL-compatible queries which can be used with most any relational database, such as INFORMIX.

The data which each data server sends to data collector 215 is preferably sent in ASCII. For each row in the database table, a record is sent which is terminated by a linefeed character. Within each of these records is the set of fields from the database table, listed in the same order as they are stored in the table. A vertical bar may be used to delimit fields in the response.

Each data server may transmit database table data by piping the data directly to Zmodem, a well-known and widely available "freeware" package which allows files to be transferred between systems. Since Zmodem sends status messages to the standard error device, both the data server and data collector 215 must redirect the standard error output before invoking Zmodem to prevent messages from appearing on the console.

When Zmodem terminates, data collector 215 may send a command to the data server to obtain the status of the Zmodem transmission. If an error was detected, data collector 215 should log an error message. If data collector 215 has started Zmodem but the data collector encounters a problem in starting Zmodem, the Zmodem on data collector 215 will time out, and data collector 215 must "flush" all characters off of its port to discard error messages sent by the data server. On the other hand, if the data collector starts Zmodem successfully but data collector 215 encounters a problem in starting it, data collector 215 must send a string of control-X's to the data server to terminate Zmodem on the CBX side.

Certain minor changes to the standard Zmodem may be made to enhance its operation with the present invention. In particular, Zmodem normally checks an environment variable to determine the filename to be transmitted. It may be modified on the data server side to instead check for a filename specified on the command line in order to allow data collector 215 to specify the file name. On the collection computer 214 side, Zmodem may be modified slightly to inhibit sending the terminating carriage return and linefeed when sending an acknowledgement, and should be modified to log errors into a message log on collection computer 214. Finally, changing the block size constant (KSIZE) from 1024 to 2048 allows Zmodem on collection computer 214 to acknowledge blocks only after receiving 2048 bytes, requiring fewer acknowledgements. Of course, other communication packages other than Zmodem may be used.

Each data server 210 terminates when data collector 215 logs off using a log-out command.

DATA COLLECTOR STRUCTURE

Figure 7:
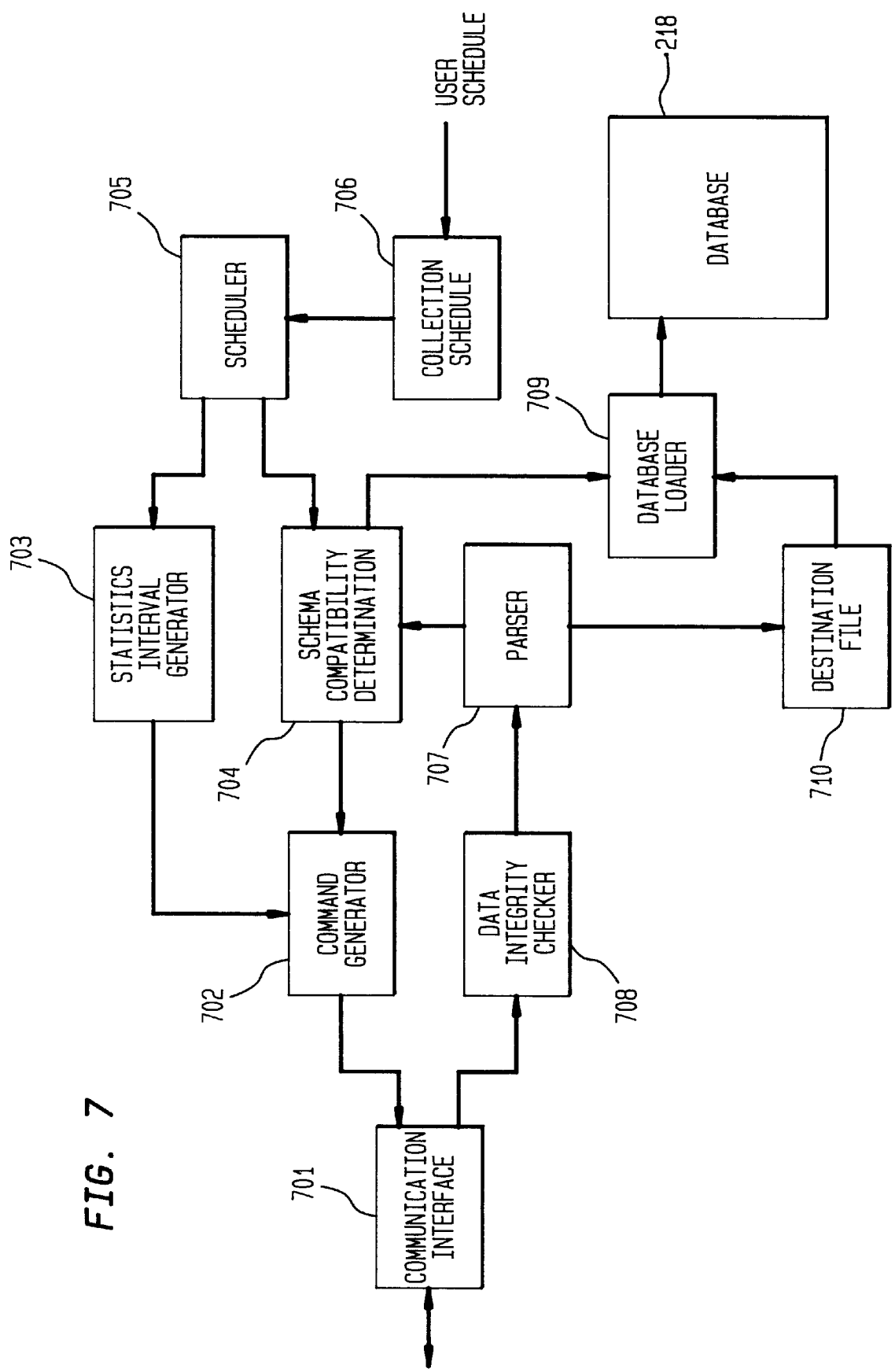
FIG. 7 shows one possible manner of implementing data collector 215 of FIG. 2 in accordance with embodiments of the present invention.

FIG. 7 shows how data collector 215 may be implemented as a group of functions and data structures on computer 214 of FIG. 2 (that is, all of the functions and data structures of FIG. 7 may reside on physical computer 214). Beginning at the right side of FIG. 7, the user-specified data collection schedule (including a list of CBXs and collection times) is stored into a collection schedule data structure 706. Scheduler 705 periodically refers to collection schedule 706 to determine when a data collection session should begin. Initially, scheduler 705 instructs schema compatibility determination function 704 to determine the compatibility between the database stored on each CBX and that of database 218. Schema compatibility determination function 704 in turn issues a request to command generator 702 to generate a schema command in turn to each CBX listed in the collection schedule 706. Command generator 702 generates such a command and transmits it through communication interface 701 (which may comprise the Zmodem protocol) to the designated CBX.

Information received from each CBX returns by way of communication interface 701, and may be passed through data integrity checker 708 and parser 707 to, extract the received information (note that data integrity checking for commands may be provided by using the full duplex echo from each data server 210 to check each character as it is sent, while data integrity checking for database records may be provided by Zmodem itself). Communication interface 701 may be constructed so as to include parts of command generator 702, data integrity checker 708, and parser 707. The schema configuration in each CBX is transmitted to schema compatibility determination function 704, which relays this information to database loader 709 in order to accommodate possible differences between database schemas.

Data collection begins when scheduler 705 determines that it is time to collect data from a particular CBX. In this regard, scheduler 705 instructs statistics interval generator 703 to generate one or more time intervals for data collection from the designated CBX (depending on whether data has already been collected from the particular CBX). Command generator 702 generates an appropriate SELECT command and transmits it to the designated CBX through communication interface 701.

Data returned from each CBX passes through data integrity checker 708 and parser 707, which unpacks the data and stores it into destination file 710. When all the data intervals for a particular collection session are stored into destination file 710, database loader 709 reads the data from destination file 710 and stores it into database 218, making any necessary adjustments for schema differences (e.g., padding fields or ignoring fields as needed).

DATA SYNCHRONIZATION

When data is received from each data server, data collector 215 attempts to load records into a corresponding table in database 218. If some records are loaded and an error is encountered, data collector 215 will "roll back" the table to the state it was in before any entries were added. When all records from a particular time interval are added to a table in database 218, data collector 215 "commits" the records.

Data collector 215 may be able to select information from some tables, but not others, in a data collection session. In this case, it must keep track of which tables did not get the information for the current interval. When the time comes for the next data collection session, data collector 215 proceeds to the next interval for the tables for which it obtained the last interval, but stays at the previous interval for the other tables where it encountered a problem. In other words, for each database table, data collector 215 must keep track of which data intervals need to be obtained from the CBX. Doing so allows it to retrieve information for a table which had a problem, but then was repaired on the CBX. For such a table, data collector 215 stays at the interval in which it encountered a problem until one of the following occurs:

a. Data collector 215 is able to obtain data for that interval, or b. Data collector 215 cannot obtain data for that interval, but is able to obtain data for a following interval. In this case, data collector 215 proceeds to the interval after the last one collected in its net data collection session. In addition, data collector 215 may log an error message for each interval for which data could not be collected. The error message may include the database type (statistics or configuration), the data type of the table, the table name, and the interval not collected (for example, 1:00 to 1:15).

In the case where data collector 215 has been off-line for a period of time and then gets reconnected to the CBX, it must be able to collect data starting from the interval where it left off for each table to the last interval stored on the CBX.

CONFIGURATION CHANGES

In various embodiments, each record in each statistics table maintained in each CBX includes a field indicating whether a configuration change has been made on the CBX (for example, adding a new agent or group). When data collector 215 collects statistics information from each CBX, it checks this configuration change flag in each record to determine if the configuration for that CBX has been changed. If so, data collector 215 initiates a transfer of the configuration database stored on the CBX into database 218 in order to ensure that the configuration database stored in database 218 matches that stored in the CBX.

CREATING ORGANIZATIONAL HIERARCHIES

Various embodiments of the present invention contemplate the creation, modification and storage of information relating to management organizations which are superimposed on the agent/group structure maintained within each CBX. Thus, while each CBX maintains information relating specific agents to groups for the purposes of automatically routing incoming telephone calls and maintaining statistics at the agent and group level, it is desirable to superimpose a hierarchy on top of the agent/group structure, wherein the hierarchy can be arbitrarily defined, changed, and used as the basis for accumulating telephone calling statistics in a manner not possible at the CBX level. Thus, the present invention contemplates accumulating telephone statistics not only on a timed basis (as depicted in FIG. 3), but on a hierarchical basis as well, as will now be described.

Figure 8:
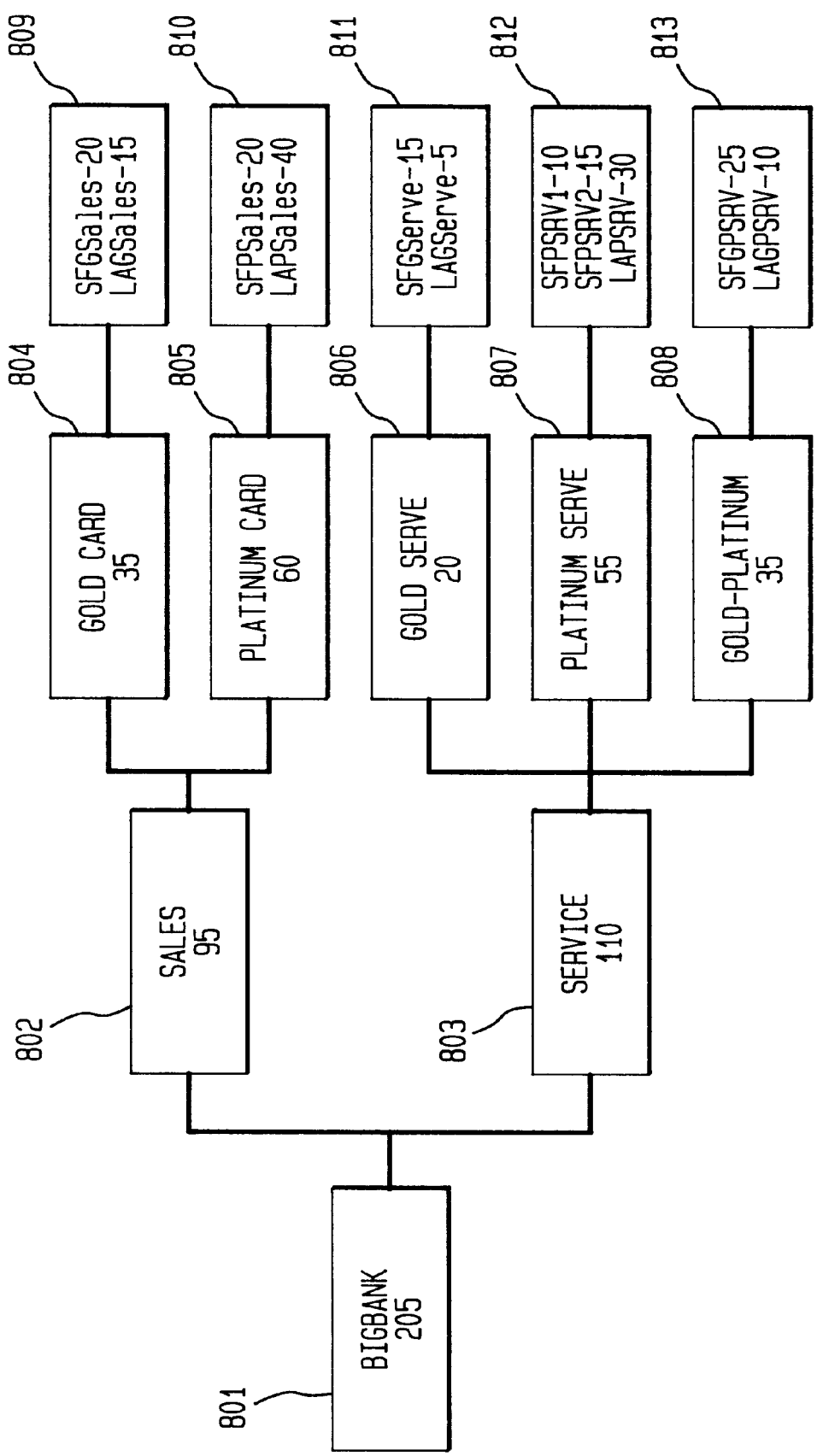
FIG. 8 shows an example of accumulating telephone calling statistics in a hierarchical manner beyond the groupings recognized in each CBX in accordance with embodiments of the present invention.

FIG. 8 shows an example of accumulating telephone calling statistics in a hierarchical manner beyond the groupings recognized in each CBX (the number within each box represents the number of telephone calls received at that level of the hierarchy, as will be explained in greater detail below). In essence, business structure information has been added to the group information recognized by each CBX. In FIG. 8, an organizational structure is shown for the fictitious "Bigbank" company. The "root" of this structure, Bigbank 801, is divided into two major departments: sales 802 and service 803. The sales department is further divided into two sections 804 and 805: one responsible for the sales of gold card credit facilities (the credit and financial services that the bank provides for retail customers who use its gold credit cards), and the other responsible for platinum card credit facilities. Both sections have groups of agents to handle incoming telephone calls.

The service department 803 is divided into three sections 806, 807 and 808, the first responsible for servicing gold card credit accounts, the second for servicing platinum card credit accounts, and the third for servicing both types of accounts. All three sections have groups of agents to handle calls.

Gold card section 804 is serviced by two groups of agents in 809: SFGSales (San Francisco Gold Sales, located in San Francisco) and LAGSales (Los Angeles Gold Sales, located in Los Angeles). Each group would typically be connected to a separate CBX; in the example of FIG. 8, Gold card section 804 thus includes agents at two different physical locations. Other groups are as depicted in FIG. 8, with each group within elements 810–813 being the highest organizational level recognized by a particular CBX.

The organizational structure of FIG. 8 may be created in accordance with the present invention as will be described in more detail herein. Each organizational structure is used to define how statistics are accumulated. For example, after creating the organizational structure of FIG. 8, a report can be generated which shows various telephone calling statistics for any of the following organizations or conglomerations:

total number of calls for a particular group (such as San Francisco Gold Card Sales, contained in element 809))

average time spent talking across all groups which provide gold card service (element 806)

total number of abandoned calls across all groups which provide platinum card service (element 807)

total number of calls across all groups which handle gold card sales (element 804)

average time spent waiting across all service groups (element 803)

average time spent talking for all agents in Bigbank (element 801).

Because statistics are available not only by group, but by individual agents, organizations can be created based on a hierarchy not tied to a particular calling group. Thus, in addition to statistics being kept for San Francisco Gold Sales as a group, statistics are also maintained for each agent in that group, and thus agents can be "grouped" in a manner independent from the CBX groups tied to telephone lines. As one example, all agents who were hired in a particular year could be grouped together and statistics accumulated automatically for that "group" of agents, even though they work at different locations and from different CBXs.

Data totals are contemplated to be stored in the database for individual members of the organization as well as for each level of the organizational chart as the data is collected. In FIG. 8, the number in each box represents the number of telephone calls handled for that organizational entity over a particular period of time (e.g., 15 minutes), with a total of 205 telephone calls handled for Bigbank. Thus, the Bigbank total may be accumulated automatically as the data is collected, rather than waiting until a report is requested. For an accumulation which spans a long time period (such as a year), the "raw" 15-minute data records may have been deleted long ago to conserve disk space, while the intermediate accumulations of week and month may still be retained, allowing a yearly total to be accumulated without the "raw" data.

The present invention contemplates storing accumulated information based on a "view" of the organization. For any one day, there is only one "view" of the organization. Initially, there may be a "current view", and if changes are made to the organizational structure, these changes are stored in a "pending view". The pending view may be modified as desired, and at a specified date, the latest version of the pending view will be converted into the current view. The old current view then becomes a "past view" that is valid for a particular date range, such as from January 3 to February 22. Data accumulation is normally for the current view, but may be for a past view if collecting old data.

Data may be adjusted for the time zone in which a member of the organization is located. For example, data for groups located in the Eastern time zone that report to a management group located in the Pacific time zone may be accumulated with three hours subtracted from the time intervals. In the Bigbank example of FIG. 8, data from groups in the Eastern time zone for the 9:00 a.m. interval may be accumulated into the 6:00 a.m. interval for the management group located in the Pacific time zone.

Figure 9:
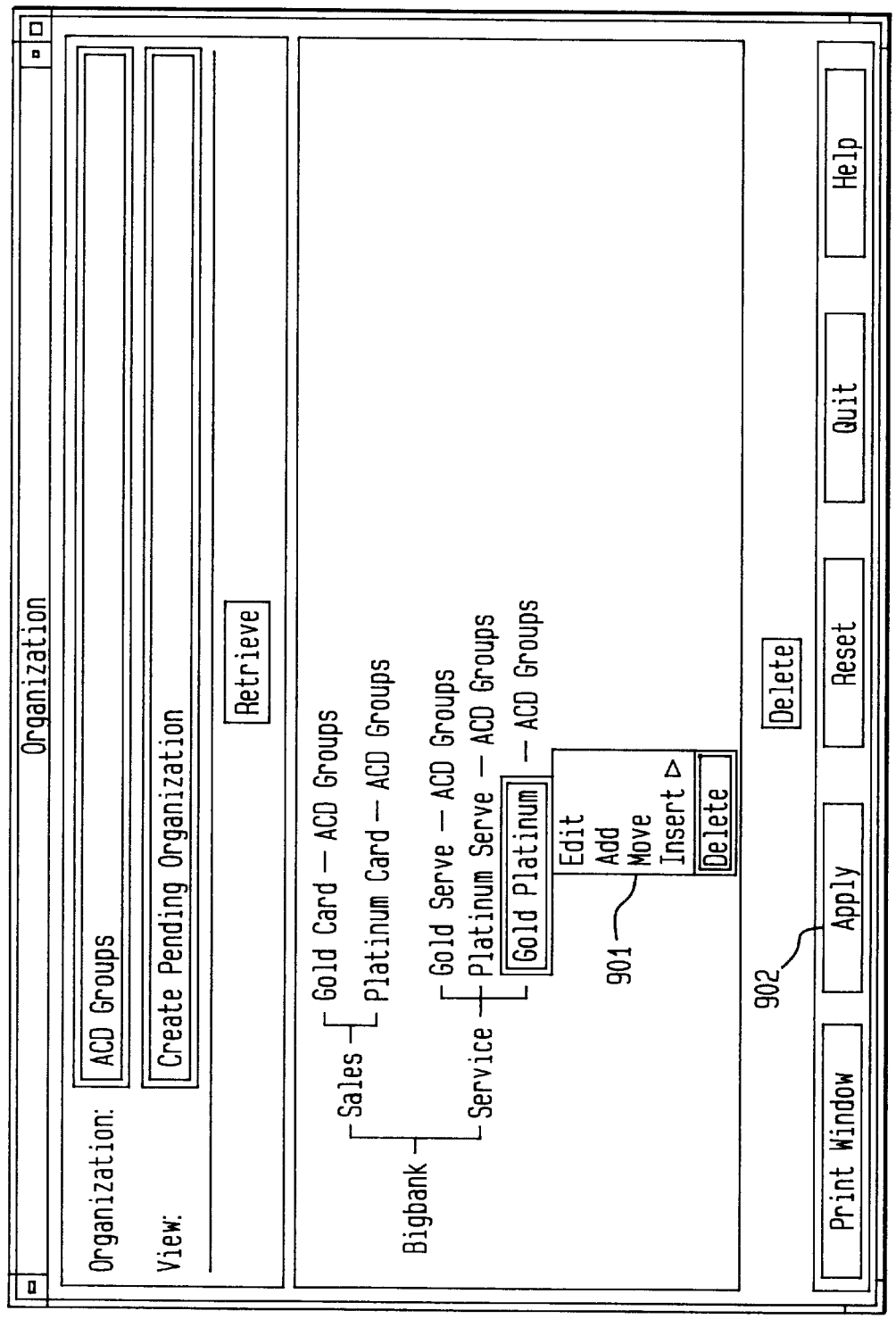
FIG. 9 illustrates one example of a computer screen which may be used to create and modify organizations in accordance with embodiments of the present invention.

The organizational structure shown in FIG. 8 may be created through the use of screens controlled by user interface 216 of FIG. 2 (all of which may operate on computer 214 of FIG. 2) as will now be described. FIG. 9 shows an example of a screen for allowing a user to create or modify a new organization. The "view" depicted in FIG. 9 is a "pending" organization which has not yet been made the "current" view. The user may add to the tree structure by using a mouse and pop-up windows to enter information. Creating an organization preferably proceeds in a "top-down" manner, wherein the Bigbank group is created first, followed by the Sales and Service groups, etc. By highlighting one of the groups (such as Gold-Platinum, highlighted in FIG. 9), a pull-down menu 901 may be provided to allow the user to edit, add, move, or delete the group. When all of the desired modifications have been made to the organization chart, an "Apply" button 902 may be selected to save the "pending" organization. The "pending" organization will be stored into the "current" organization for which statistics will be automatically accumulated, on the date specified.

Figure 10:
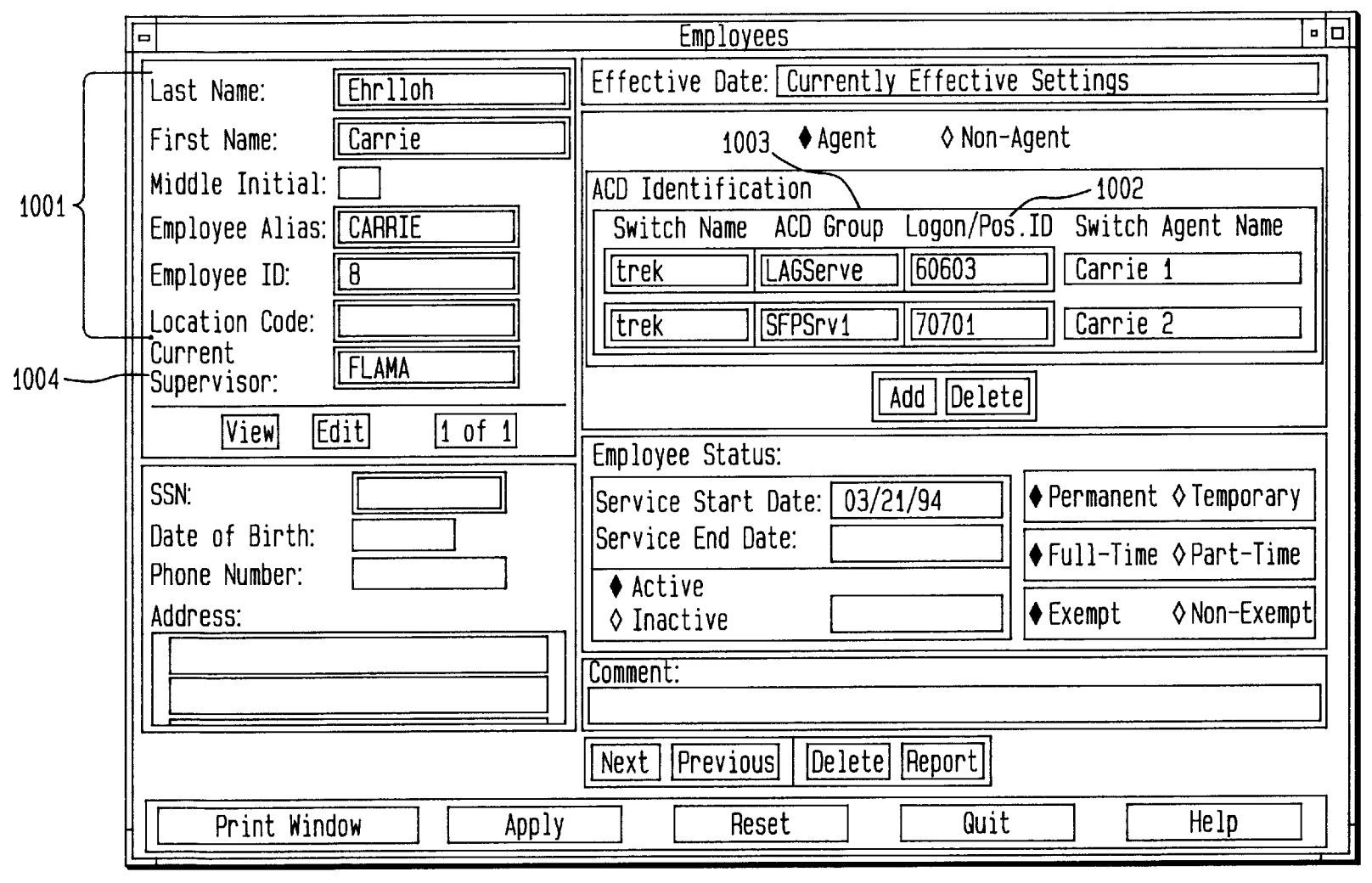

FIG. 10 shows how individual employee information may be entered from a computer screen. Referring to FIG. 10, entry fields 1001 can be used to enter the employee's name, and if the employee is an agent, an agent log-on identifier 1002 and ACD (automatic call distribution) group 1003 identifier. Because a particular employee (agent) may have more than one log-on identifier, entering all such log-on identifiers and associating them with the specified employee allows the user to refer merely to the employee name when creating reports, rather than specifying all the log-on identifiers (which are stored in each CBX rather than employee names). Additionally, the employee's current supervisor 1004 is entered. After entering a plurality of employees in this manner, an administrative hierarchy can be automatically created. The administrative organization can be separate and apart from the "group" organization shown in FIG. 9. That is, statistics can be accumulated by one or more administrative hierarchies (supervisors, managers, individual employees, etc.), and they can also be separately accumulated by one or more business hierarchies (company-wide, department, division, sales group, etc.). Although administrative and business hierarchies are illustrated as two specific structures, other hierarchies are of course possible and the invention is not intended to be limited in this respect. For example, hierarchies can be created based on log-on identifiers or trunk groups. Using separate hierarchical schemes each having a separate accumulation structure, reports can be generated for specific groupings of agents (for example, the Sales group, regardless of which specific agents are currently assigned), and reports can also be generated for specific persons, regardless of the groups to which they have been assigned.

Figure 11:
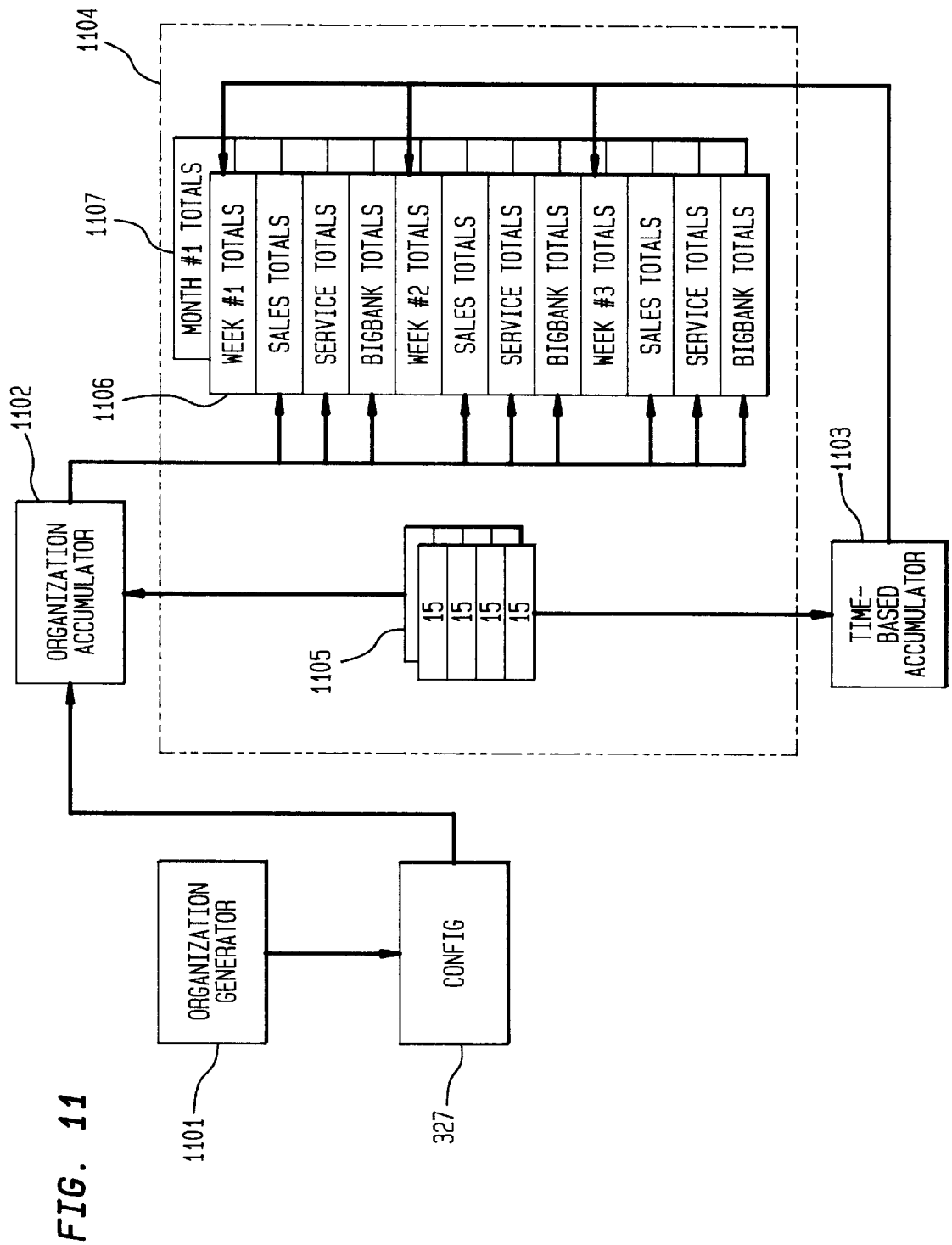
FIG. 11 shows an example of how organizational and timed statistics may be accumulated into data records in database 1104 in accordance with embodiments of the present invention.

FIG. 11 shows how telephone calling statistics may be accumulated into various data records by organizational structure. The components shown in FIG. 11 may all reside on computer 214 of FIG. 2. Organization generator 1101 generates organizational information in accordance with the information entered by the user in the screens shown in FIGS. 9 and 10 and stores the information into configuration database 327, which may be the same configuration database illustrated in FIG. 3. This information identifies the structure by which statistics will be accumulated at various levels. In accordance with the principles explained with reference to FIG. 3, data records at various timed intervals are collected into database 1104 into tables 1105, for example using data records which each represents a 15-minute summary of information generated by each CBX. It will be noted that each data record in tables 1105 may contain a plurality of fields, each field holding a value of a particular statistic (i.e., total number of calls received for a group, or average time spent waiting per agent).

Data records are stored in tables 1105 as a result of the automated data collection process from a plurality of CBXs. As data records are collected, time-based accumulator 1103 accumulates values across a plurality of records in tables 1105 and stores corresponding totals into data records in tables 1106 and 1107. Thus, table 1106 may correspond to table 322 of FIG. 3, each record of which contains statistics accumulated on a weekly basis, while table 1107 may correspond to table 323 of FIG. 3, each record of which contains statistics accumulated on a monthly basis. In accordance with the present invention, time-based accumulator 1103 stores totals on a weekly basis into table 1106 and on a monthly basis into table 1107.

Organization accumulator 1102 refers to configuration database 327 to ascertain which organizational totals are to be accumulated, and accumulates data records from tables 1105 into organizational totals records in tables 1106 and 1107. As shown in FIG. 11, the organizational hierarchy has been created to record totals by sales department, service department, and Bigbank. Thus, each record in table 1106 which relates to the organization contains accumulated totals by week by organizational unit. The information is accumulated automatically during the data collection process, such that table 1106 may be updated on the same interval as data is collected from each CBX. Similarly, table 1107 may be updated on the same interval as data is collected from each CBX but with each record representing monthly statistics. Accordingly, data is accumulated incrementally and in desired units during the data collection process, rather than at the time a report is generated. Accumulators 1102 and 1103 may be combined into one accumulator. As pointed out previously, data records from table 1105 may be periodically deleted (for example, on a "rolling basis" after 42 days) to conserve disk space, while the accumulation tables illustrated by table 1106 may be retained. In this manner, useful information from the "raw" data may be retained without actually retaining the raw data.

In various embodiments, organization accumulator 1102 may store records in tables 1105 by organizational level. That is, 15-minute records may be stored in tables 1105 for sales, service, and bigbank, in addition to being accumulated into tables 1106 and 1107 over longer time intervals.

REPORT GENERATION

Figure 12:
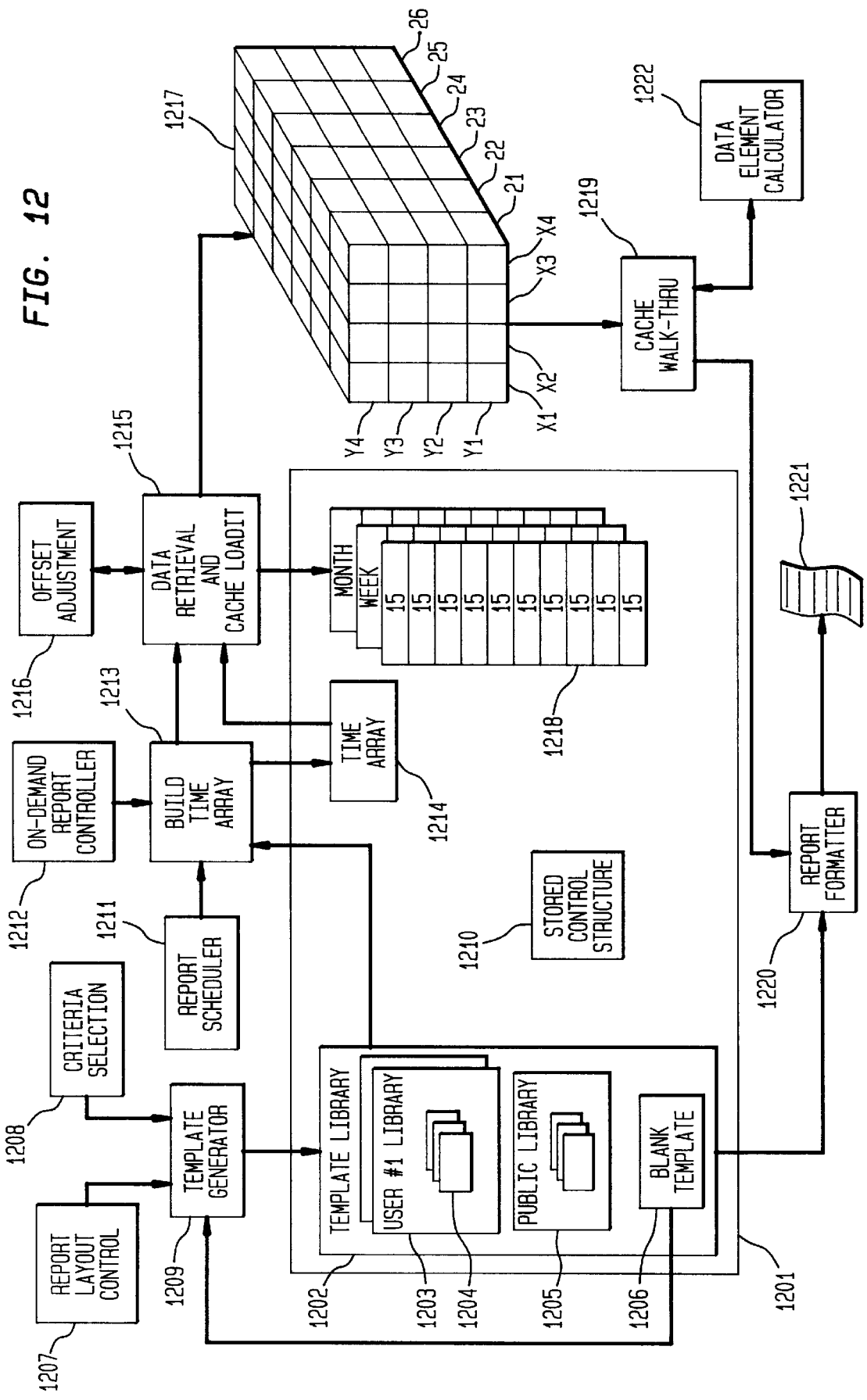
FIG. 12 shows one implementation of various report generation features in accordance with embodiments of the present invention.

In accordance with the principles of the present invention, the information created in table 1106 (and other similar tables shown in the Figures) may be used to create on-demand or automatically scheduled reports. FIG. 12 shows one possible implementation for the report generation features of the present invention; FIGS. 13 through 18 show various possible screen layouts for allowing a user to enter report information and generate reports. The following describes in more detail the operation of the report generation features of FIG. 12 with references to the display screens of FIGS. 13 through 18 as appropriate. All of the components shown in FIG. 12 may reside on computer 214 of FIG. 2.

In FIG. 12, a database 1201 (which may be located within database 218 of FIG. 2) comprises a template library 1202 which contains user libraries 1203, a public library 1205, and a blank report template 1206. Each user library 1203 may comprise one or more report templates 1204 each of which contains information needed for generating a report, including what data will be displayed and how the report is to be formatted. Each user library 1203 may be separately protected from other users, such that only a particular user having specified access privileges may create the reports included in his user library. Thus, for example, reports which contain sensitive information can only be generated using templates which are stored in a user library with protection features. On the other hand, public library 1205 contains report templates which can be accessed by any user, and no protection is needed to prevent unauthorized access.

Report layout control function 1207 and criteria selection function 1208 may be used in various embodiments to design the contents and format of a particular report. Template generator 1209 receives the layout and criteria information from report layout control function 1207 and criteria selection function 1208 and, beginning with a "blank" template 1206, generates a report template for storage into template library 1202. Once a report template is created, a report may be generated either on demand or on an automatically scheduled basis from the template. Generally, report layout control 1207 handles formatting information (e.g., how the report looks and the units in which information is displayed), while criteria selection function 1208 qualifies what data will be displayed in the report (e.g., what fields from the database, what time zones, etc.). Although shown separately for purposes of discussion, these two functions can of course be combined.

Figure 13:
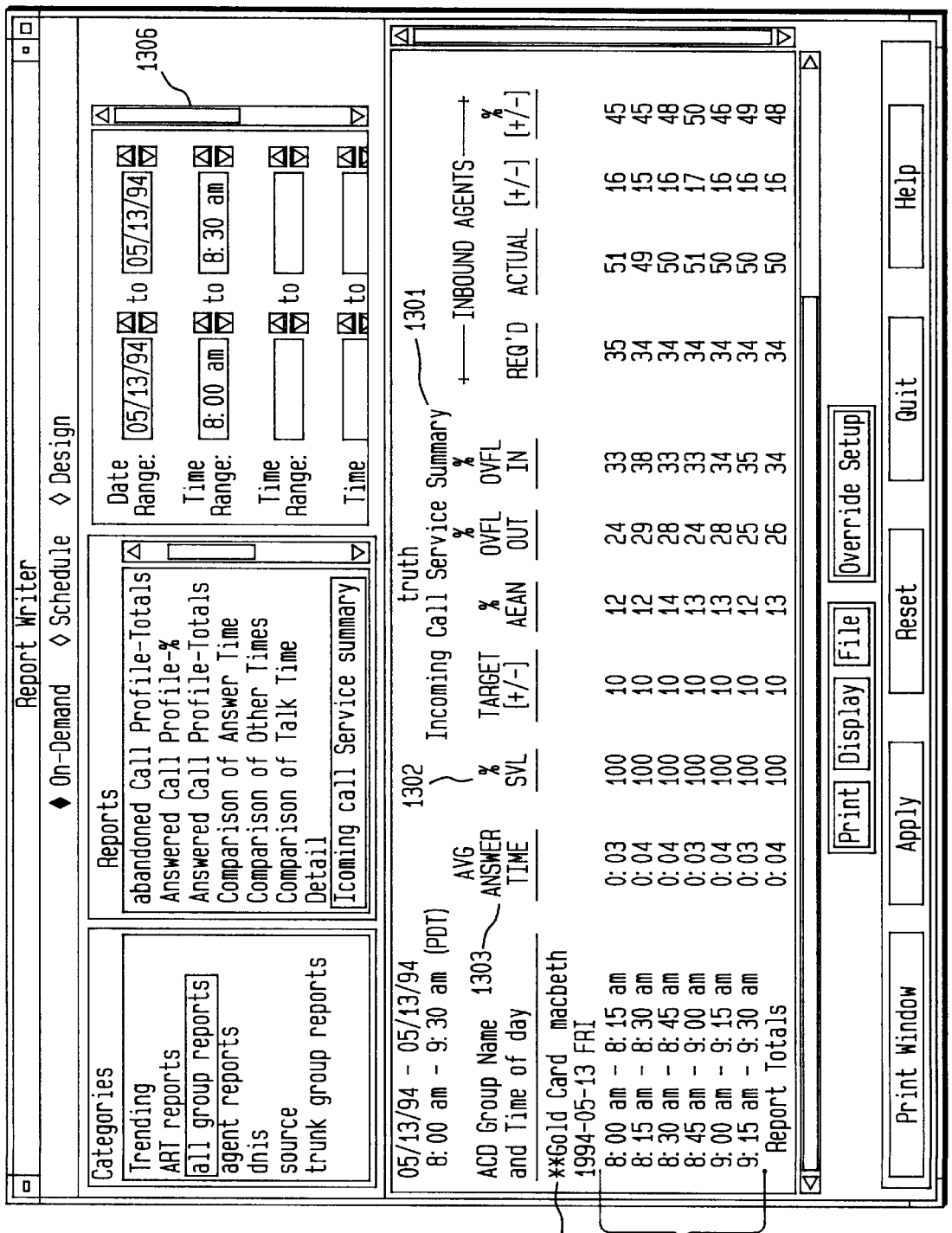
FIG. 13 shows one example of a report generated in accordance with various principles of the invention.

In various embodiments, each report comprises a report header and one or more report sections, each section comprising a section header, column headers, and columns and rows of data. FIG. 13 shows an example report comprising a report header 1301, column headers 1302 and 1303, section header 1304, and a plurality of data rows 1305 each row having a plurality of column values arranged under appropriate column headers. In accordance with the invention, a user may specify the layout and data included in each report without the need for using or understanding database query languages such as Structured Query Language (SQL).

Figure 14:
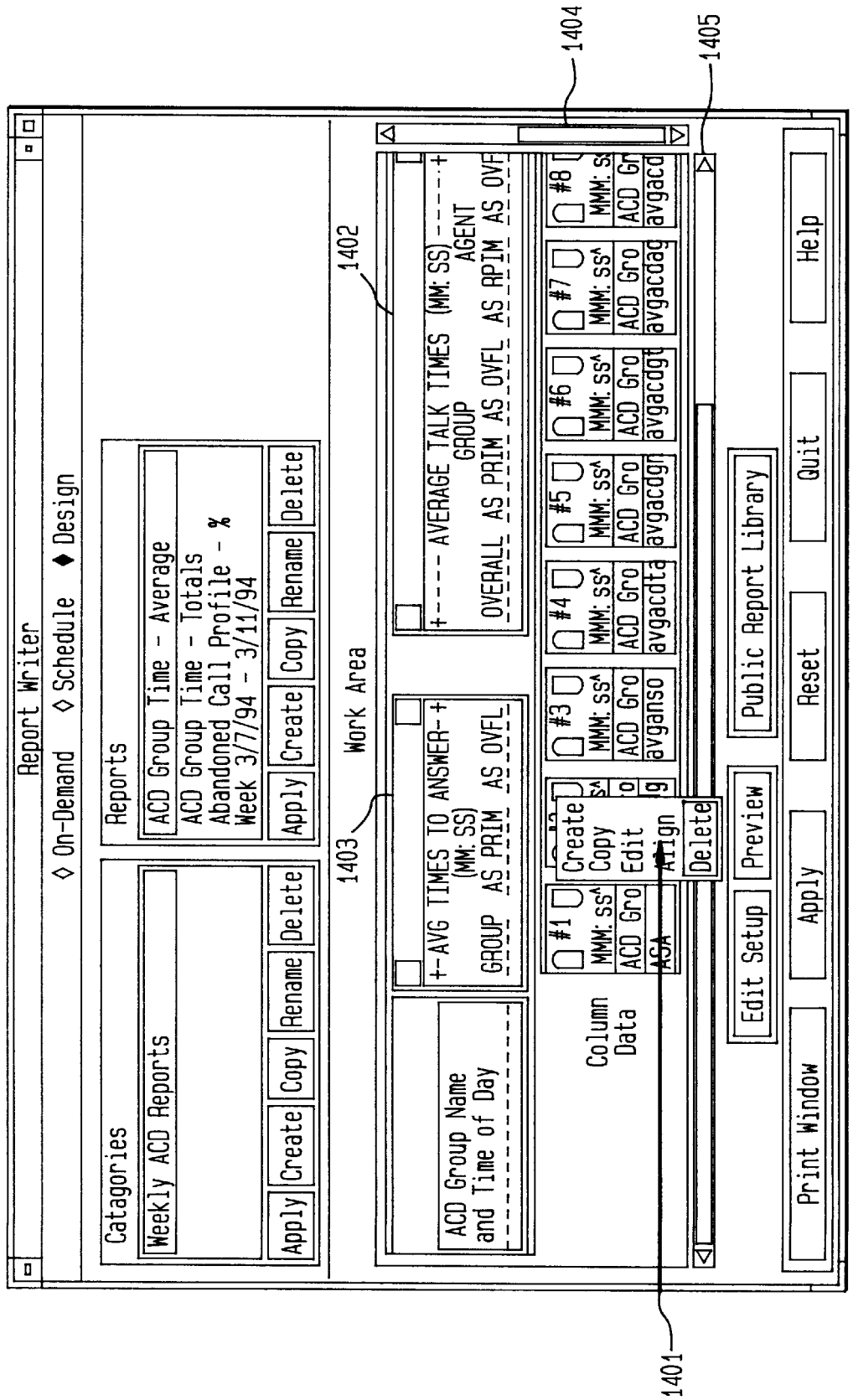
FIG. 14 shows an example of a screen layout for allowing a user to edit the layout of columns for a particular report in accordance with embodiments of the present invention.
Figure 15:
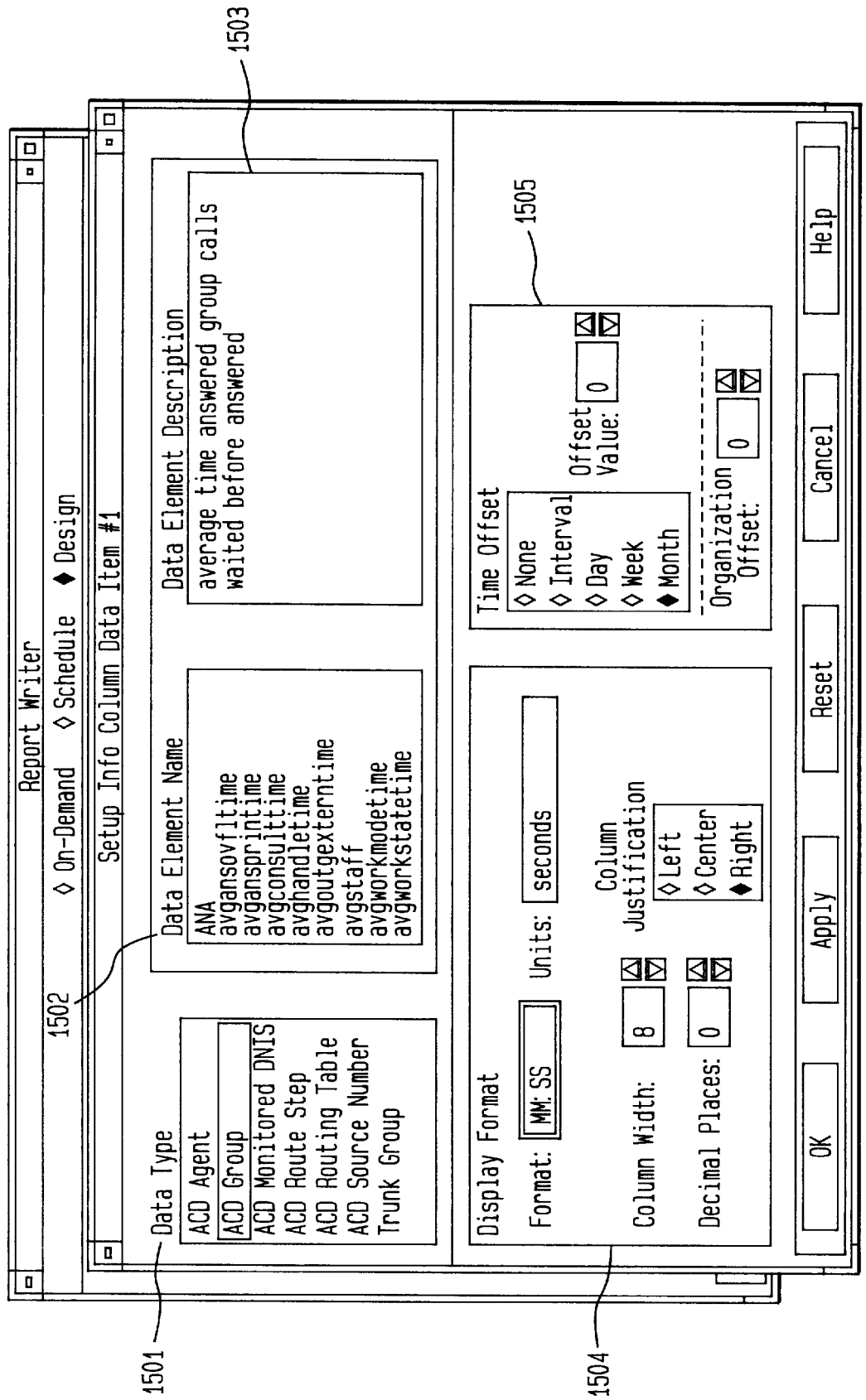
FIG. 15 shows an example of a screen layout for allowing a user to specify data types and elements for one column of a report in accordance with embodiments of the present invention.

FIG. 14 shows one possible implementation of a data entry screen which allows a user to specify the layout and a portion of the data to be included in a report. A pull-down menu 1401 allows the user to create, copy, edit, align or delete columns of data as desired. Additionally, the user may create and manipulate graphically various column headers 1402 and 1403 using a mouse pointer, for example. Scroll bars 1404 and 1405 may be used to arrange the created information within the space available in the display window. In the example of FIG. 14, eight columns are shown as having been created by the user. When a new column is created, report layout control function 1207 automatically displays the new column, and then preferably invokes the setup information display screen shown in FIG. 15 to allow the user to specify certain information about the data which is to appear in that column of the report. Thus, in various embodiments, the display screen of FIG. 15 is invoked after each column in FIG. 14 is created and the user enters information accordingly With reference to FIG. 15, the user may specify a data type 1501 for the column, such as agent or group, and a data element name 1502 which identifies either the specific data item to be displayed or a calculation value which corresponds to a mathematical operation performed on one or more specific data items (such as an average of two data items). Display box 1503 may display the text description of a particular data element name highlighted by the user. Thus, while data element names in box 1502 preferably correspond to record field names (or calculations thereon) from accumulation records stored in database 311 of FIG. 3, display box 1503 allows a novice user to select data elements for display based on an easy-to-read description of the data element. Display format box 1504 allows the user to specify the format, units, column width, and other formatting information for each column. Time offset box 1505 allows the user to specify time and organizational offsets. A time offset may be used to timeshift fields which are juxtaposed in a report, such that a first column may represent today's total number of calls per agent, while a second column to its right may represent yesterday's total calls per agent. Thus, offsets provide an easy way to compare the same data element under different conditions. The offsetting is performed by offset adjustment function 1216 shown in the top of FIG. 12 as described later with reference to data retrieval from the database. An organizational offset may be used to compare different levels of information in the organization hierarchy (for example, comparing Bigbank's total phone calls per agent with the Sales department of Bigbank). The information entered by the user in screens 14 and 15 is stored in a template generated by template generator 1209 and stored into a report template in template library 1202.

Figure 16:
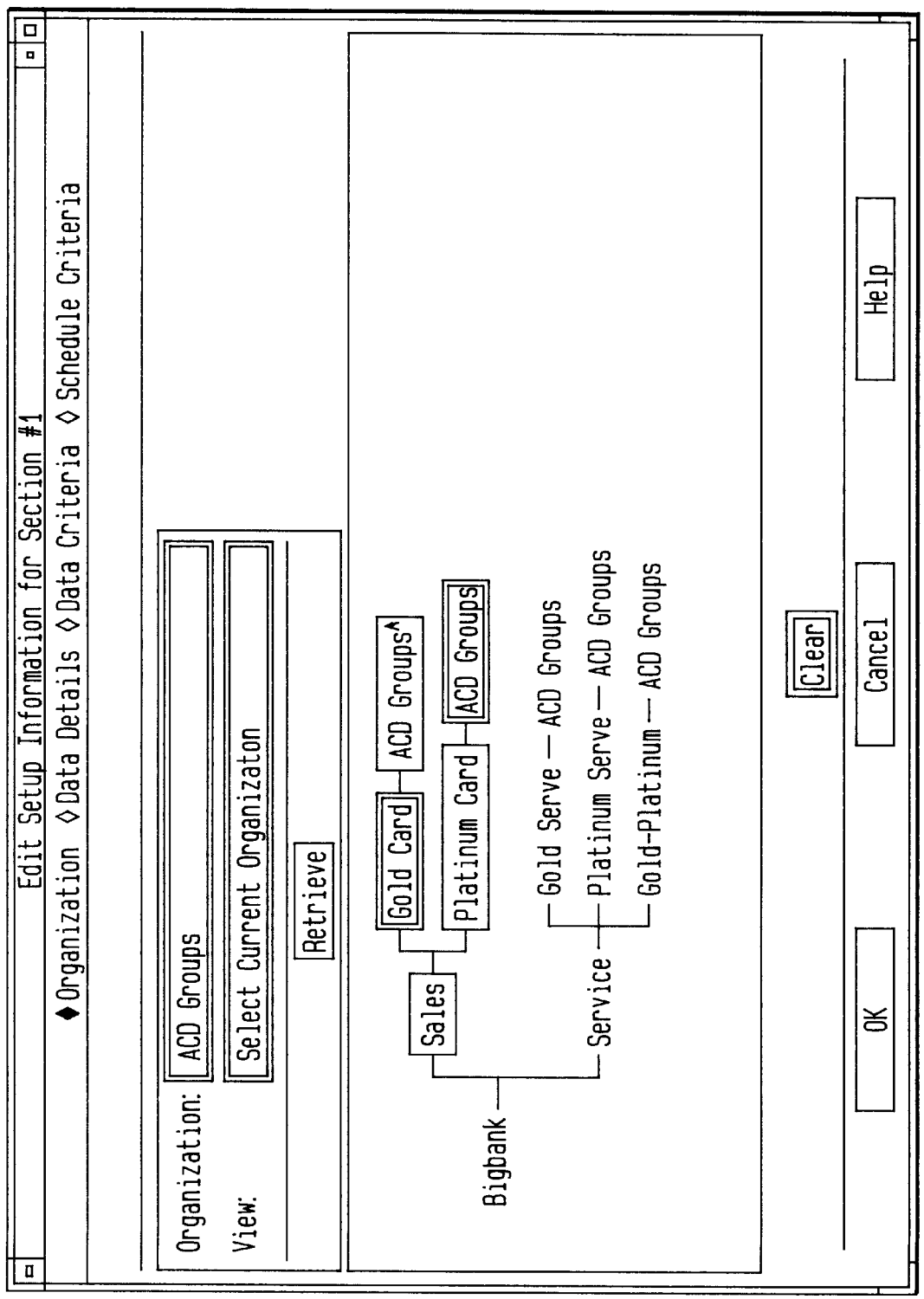
FIG. 16 shows an example of a screen layout for allowing a user to select organization members for display in a report in accordance with embodiments of the present invention.

In accordance with the principles of the present invention, the user may also select the organizational levels which will be displayed in each report. FIG. 16 shows one possible screen which may be used to allow the user to select the organizational levels which will be displayed; these preferably correspond to the organizational levels accumulated in database 1104 of FIG. 11. In other words, the user may graphically select the organizational level using the display screen of FIG. 16 without understanding the particular database record structures used to store the same information. Thus, FIG. 16 shows that data will be reported at the Gold Card level (representing multiple groups of agents); the report shown in FIG. 13 displays **Gold Card as a section header indicating that the data in that report section is accumulated at the Gold Card organization level.

FIG. 17 shows one possible screen display for allowing the user to enter "data details" indicating the time accumulation level that each row in the report will correspond to. For example, FIG. 17 shows that "Quarter Hour" has been selected; the report shown in FIG. 13 accordingly includes rows which represent 15 minute time increments. Because it is contemplated that this data is already stored and available in the appropriate time accumulation level in the tables shown in FIGS. 3 and 11, the time accumulation level inferentially specifies the particular data table from which data will be retrieved.

Finally, FIG. 18 shows one possible screen display for allowing the user to enter "data criteria" including organization sort order 1801, time qualifier 1802, and "where conditions" 1803 and 1804. The organization sort order specifies the order in which organizational data will be displayed in the report. Each organization may be displayed, for example, in alphabetical order, reverse alphabetical order, or current hierarchy order, the latter indicating that report sections will be presented in the order in which they appear in the organizational hierarchy. Time qualifier 1802 allows the user to present data as if it occurred in a different time zone. This feature may be particularly important in the case where data is collected from multiple CBXs located in different time zones. The default may be set to "unadjusted" so that times in each report appear as collected in their "native" time zone. If the report generator is located in San Francisco and the "unadjusted" option is used, the report may contain data from the time zones of the different CBXs, although the user may have intended that data be compared at the same "absolute" time. In various embodiments, a pop-up window may be displayed (not shown) to allow the user to select from a plurality of time zone choices. If one of these time zones is selected, then all data will be "translated" into the selected time zone to allow the user to properly compare data. For example, if data is collected from a West coast CBX and an East coast CBX, the user could select a Central time zone qualifier, and all data from each coast would be "translated" forward or backward appropriately to appear in the report.

In FIG. 18, various "where" conditions may be used to further qualify the data presented in the report. For example, the report may be limited to displaying only data in which the average number of telephone calls exceeded 200 per hour. This can be done by entering the appropriate data element name, operator and value in window 1803. Moreover, multiple conditions may be logically joined with an "AND" or "OR" operator 1805 for more complex operations.

After the above described information is entered by the user, template generator 1209 may create a report template, assign it a name designated by the user, and store it in one of the user libraries 1203 or public library 1205. Additionally, in various embodiments it may be desirable to pre-create internal data structures based on the template information and store such structures into stored control structure 1210 in order to speed up retrieval at report generation time.

On-demand report controller 1212 allows the user to select a date and time range for data to be included in the report; this may be selected using a display box 1306 such as that shown in FIG. 13. Alternatively, report scheduler 1211 may be used to "permanently" schedule reports on a daily basis, hourly basis, or the like, with data retrieval tailored to the schedule. Either on-demand report controller 1212 or report scheduler 1211 can be used to invoke build time array function 1213, which in various embodiments may create a time array 1214. Such a time array may be used to hold information such as the dates and times requested, the types of totals requested (daily, weekly, hourly, etc.), time zone information, and the like.

Data retrieval and cache loader 1215 generates one or more SQL statements to retrieve data from accumulation tables 1218 based on information from the report template. In summary, a SQL statement is generated which selects one or more tables based on the accumulation levels selected (e.g., shift, week, month, Gold Card Section, Bigbank, etc.); selects one or more fields in these tables based on the data elements selected (e.g., total number of calls generated per agent); and further qualifies records based on the time range specified for the report (box 1306 in FIG. 13) and any criteria specified in FIG. 18 (such as "where total number of calls is greater than 200"). It should be readily understood how the information generated from the aforementioned figures and stored into report templates can be used to form one or more SQL statements for database retrieval.

The SQL statements may be adjusted. in offset adjustment function 1216 based on time offsets, organizational offsets, or time zones included in a report template. For example, if a time offset of one day is specified for a second column relative to a first in a report, then the SQL statement will be adjusted to retrieve data for the same time (but preceding date) from that specified in the first column. Similarly, if the user specified a "Sales" group level for display in the report, an organizational offset of +1 would also retrieve data at one level higher than the Sales group for juxtaposition in the report.

Time zone translation may be performed as follows. When an organization is selected which includes accumulated data from CBXs in different time zones, data retrieval and cache loader 1215 creates two separate SQL statements, one for each CBX table (see FIG. 3), and changes the time qualifier in one or more of the SQL statements to account for the different time zone.

Data retrieval and cache loader 1215 retrieves data from one or more tables, including accumulation tables 1218, and loads cache 1217 with the retrieved data. Although there any many different ways of loading the retrieved data into a memory structure, in various embodiments cache 1217 may be loaded with the retrieved data as follows, by way of example. A three dimensional structure may be created having an X axis with elements X1 through X4, a Y axis with elements Y1 through Y4, and a Z axis with elements Z1 through Z6. The X axis may be used as a time axis (each element representing a unit of time such as one week), the Y axis may be used to indicate organization members (such as a particular agent, group of agents, or the Sales group), and the Z axis may be used to represent field values in each record (such as total number of calls for a particular agent).

Cache walk-through function 1219 may, in various embodiments, "walk through" cache 1217 one data item at a time and pull the data items into a row of a report. While some data items may be directly pulled into a report row for formatting by report formatter 1220, some "derived" data items may require on-the-fly calculations which can be performed by data element calculator 1222. For example, the user may have specified that a particular column should include the average talk time for a particular agent. Such a value is not directly stored in any field of any database table, but can be derived by dividing the total talk time for that agent over any particular period by the number of calls received by the agent. Thus, for example, if the total number of calls for a particular agent for a particular time period is stored in element (X4, Y1, Z1) and the total talk time for that same agent for the same period is stored in element (X4, Y1, Z2), then an indicator for a division operation can be stored into element (X4, Y1, Z3), and cache walk-through function 1219 can retrieve the two values and pass the division operation to data element calculator 1222 to perform the operation. When all of the operations and data values have been retrieved for a particular row of the report (i.e., holding X and Y constant, and "walking through" all the Z values), a plurality of row values may be provided to report formatter 1220 which, in accordance with the various display formatting information stored in the report template, generates an individual row of report 1221.

II. EXCHANGING TELEPHONE CALL INFORMATION

FIG. 19 shows how the principles of the present invention may be applied to a configuration comprising two computers which each store telephone call information. Computer 1901 shown in the left side of FIG. 19 is the same as mainframe computer 01 in FIG. 1(*a*), but with added components as will be described shortly. In FIG. 19, elements 1902 through 1912, 1914, and 1917 are identical to similarly numbered elements in FIG. 1(*a*) (i.e., elements 02 through 12, 14, and 17, respectively) and operate accordingly.

As explained with reference to FIG. 1(*a*), incoming telephone calls are routed to telephone 1904 by CBX 1902, and as the call progresses, various "call event" messages are automatically transmitted by CBX 1902 to event handler 1917, which stores the call events into modified event log 1922. Call events may be generated for each new call, call transfers, call hang-ups, etc., and each call event may include specific information such as the caller's telephone number, who answered the call, and the like.

In accordance with the principles of the present invention, modified data entry program 1920, which is a modified version of data entry program 13 shown in FIG. 1(*a*), transmits a copy of records indicating a "business value" associated with each agent's phone calls to business event handler 1921, which stores these records into modified event log 1922. For data entry applications which record sales, for example, the "business value" of the agent's telephone call could be the total dollar value of the sale; for applications which indicate that a promotional item was to be mailed to the caller, a flag indicating that such an item (and possibly its value) would be stored in modified event log 1922. Thus, modified event log 1922 contains records not only relating to telephone call events (such as an "answer" event, an "abandoned call" event, etc.), but it also includes records which relate agent information to business values associated with the particular telephone call.

Additionally, modified data entry program 1920 may also transmit an "account code" record to business event handler 1921 containing an account code indicating the nature or type of the call. The account code may be completely independent from any business value, if any, generated from the telephone call. For example, if an agent services insurance calls, the agent could press a key indicating whether the call was for automobile insurance, life insurance, or home insurance, and the key would be translated into an account code and stored into a record with other information regarding the call such as an agent identifier.

Thus, to summarize, in various embodiments, modified event log 1922 comprises three types of records:

(1) call event records each containing information which relates to a specific agent's handling of a portion of phone call (such as the answering, transfer, or abandonment of the call);

(2) business value records each correlating a particular agent's telephone call with a business value associated with the telephone call; and (3) account code records each correlating a particular agent's telephone call with the nature or type of the telephone call.

Embodiments of present invention contemplate transmitting at least some of the above identified information from modified event log 1922 to computer 1927, where the records are further processed. However, because each telephone call typically comprises a plurality of telephone call events and thus generates a plurality of call event records in modified event log 1922, it is desirable to reduce the number of records which are transmitted to computer 1927. To effect this, call segment generator 1924 collects call events relating to the same telephone call "segment" and consolidates them into a single record called a "segment record". Each call segment relates to only one person or agent. A call segment record is created when a telephone call is answered, and ends when the controlling person gives control of the call to another person or when the call is terminated (such as a hang-up or abandonment). If a call is transferred to another agent, a second call segment record is created for the second agent. In other words, each record relates to only a single agent's portion of a phone call; if the call is transferred from one agent to another, two records are generated. If a call segment is abnormally terminated (such as might occur upon a system failure), a "flush" function may be provided to delete incomplete segments according to a time-out schedule.

One possible format for a call segment record to be transmitted from computer 1901 to computer 1927 is shown in FIGS. 20(*a*) and 20(*b*) (collectively referred to as FIG. 20). The symbol "NA" for the truncation value indicates that the field may not be smaller and must have valid data, while "BLANK" indicates that the field value may be smaller and a single blank character represents an empty field. However, the record format-of FIG. 20 is by way of example only, and various other formats may be used. Moreover, not all of the fields shown in FIG. 20 necessarily need to be transmitted in order to practice the invention.

In summary, each call segment record contains a consolidated version of a plurality of call event records stored in modified event log 1922, the consolidation done in various embodiments to reduce the number of data records which need to be transmitted to computer 1927. It will be noted that the first field of the record in FIG. 20 is for identifying the record; in this case, a "C" indicates that the record is a call segment record. The record may be transmitted as a sequence of ASCII characters with fields terminated by separator characters (such as the pipe or "|" symbol). In various embodiments, it may be desirable to compress empty fields using a field separator; such compression is well known and is not elaborated upon here.

Call segment records generated by call segment generator 1924 are placed on an output queue 1925 for transmission to computer 1927 through data interface 1926. Although output queue 1925 may not be required in all embodiments, it serves to isolate outgoing messages from the operation of computer 1927. For example, if computer 1927 is disconnected or crashes, outgoing messages from computer 1901 will not be lost but can instead be queued for a reasonable period of time (such as a day) until a connection to computer 1927 is restored. Moreover, various start/stop commands may be provided in data interfaces 1926 and 1928 to coordinate the initiation and termination of data transfers between computers. Data interface 1926 may comprise any suitable communication package, such as the conventional LU 6.2 protocol available from IBM. Data interface 1926 may include error checking features to ensure reliable communication between computer 1901 and computer 1927.

Business event retrieval function 1923 retrieves business value records and account code records from modified event log 1922 and transmits them to computer 1927 through output queue 1925. FIG. 21 shows one possible format for business value records transmitted from computer 1901 to computer 1927, and FIG. 22 shows one possible format for account code records to be transmitted in the same manner.

It will be seen that the first field of each record indicates the record type so that it may be identified when it is received in computer 1927. As noted above with respect to call segment records, the specific fields and formats are exemplary only.

Reference will again be made to FIG. 19. Computer 1927, which may comprise an IBM RS/6000 computer, includes a data interface 1928 for receiving transmitted records from computer 1901. Message handler 1929 receives records including call segment records, business value records, and account code records from computer 1901. Before reviewing in detail the operation of the business value and account code functional portion of computer 1927, the operation of data collector 1931 will first be reviewed in order to clarify the commingling of data items in database 1934.

Data collector 1931 collects telephone calling statistics on a scheduled basis from CBX 1902 and CBX 1903, and stores them into records in tables 1935 in database 1934. Each record includes data summarized over a predetermined time interval, such as 15 minutes, including statistics for each agent and for each group of agents which is recognized within each CBX. Time-based accumulator 1940 operates during each data collection cycle to accumulate statistics over a plurality of records from tables 1935 according to a predefined time interval, and stores the accumulated values into accumulation tables 1938. For example, time-based accumulator 1940 may accumulate 15-minute data in tables 1935 into shift records, daily total records, weekly total records, and monthly total records, and store such records into tables 1938.

Additionally, organization accumulator 1932 operates during each data collection cycle to accumulate statistics over a plurality of records from tables 1935 based on organizational hierarchies stored in configuration database 1937, and stores the accumulated statistics into accumulation tables 1938. The organizational hierarchies may be created by organization generator 1941 as described in Section I of the present specification. Thus, accumulation tables 1938 include records accumulated both over predetermined time periods and over predefined organizational hierarchies. Report generator 1933 then retrieves data from accumulation tables 1938 and generates various reports as described in Section I of the present specification.

Because business value records and account code records received from computer 1901 include information on a call-by-call basis rather than on a predetermined time interval basis, business value accumulator 1930 may accumulate such records for each agent and group of agents into records having a predetermined time interval, 15 minutes for example, in order to be compatible with data records stored in tables 1935 by data collector 1931. The records accumulated by business value accumulator 1930 are then stored in table 1936, which is shown as being separate from tables 1935 but may be included in tables 1935 instead. Thus, business value accumulator 1930 performs a function similar to the initial accumulation performed in each of CBX 1902 and 1903.

In accordance with the principles of the invention, time-based accumulator 1940 also accumulates business value records and account code records from table 1936 and stores the accumulation records into tables 1938 accordingly. That is, business value records and account code records are accumulated on an agent-by-agent basis (and on a group-by-group basis for groups which are recognized by CBXs 1902 and 1903) and stored into tables 1938. For example, each record in accumulated tables 1938 may further include a field indicating the total business value generated by each agent over a predefined interval such as a day, a week, and a month, and a field indicating the total of each type of account code serviced by each agent over a predefined interval such as a day, a week, and a month.

In a similar manner, organization accumulator 1932 accumulates business value and account code records according to an organizational hierarchy stored in configuration database 1937. That is, business value and account code records may be accumulated according to supervisor, manager, director, vice president, etc. (administrative hierarchy), and by sales group, department, division, and corporation-wide (corporation hierarchy), for example. Such accumulation of business values and account codes allows reports to be generated through report generator 1933 which could not have been previously generated. Thus, for example, it is now possible to determine what the total sales volume for a particular period of time was for a particular agent, or for a particular department of a company, and so forth.

Call tracer 1942 may be used to search through call segment records 1939 to trace the handling of a particular telephone call. For example, call segment records can be searched for telephone calls originating from a particular number, and all of the agents who participated in the handling of that call can be identified. Other data fields available in the call segment records (see FIG. 20) may similarly be used to search for specific calls or call segments. Such "raw" data stored on a segment-by-segment or call-by-call basis is not typically collected by data collector 1931 and thus represents an additional feature for analyzing data from computer 1927.

Report generator 1927 operates as described in detail in Section I (see FIG. 12) to generate reports either on demand or automatically.

Thus has been described above a new and useful invention for exchanging telephone call information between two computers (including call segment, business value, and account code information), accumulating the information into various time intervals and organizational hierarchies, and generating reports therefrom. It should be understood that specific references to hardware or computer program components herein are by way of example only, the specific allocation of functions between hardware and software components being dictated by the particular requirements and engineering tradeoffs involved in a particular implementation. It will also be recognized that the particular ordering of various steps used to practice any methods of the present invention may be rearranged to achieve the same or substantially the same result, and that any numbering of steps in the appended claims is for ease of reference only and is not intended to limit the scope of the claimed steps to any particular order unless otherwise necessary to make the method of the invention operable.

It is apparent that many modifications and variations of the present invention are possible in light of the above teachings, and references to specific values, part numbers, or standards are by way of example only. It is, therefore, to be understood that within the scope of the appended claims the invention may be practiced otherwise than as specifically described.

What is claimed is:

1. A method of exchanging telephone call information between a first computer and a second computer, said first computer coupled to a computerized branch exchange (CBX) which services a plurality of telephone agents, said second computer comprising a database, the method comprising the steps of:

(1) generating in conjunction with a data entry program on said first computer a plurality of business value records each comprising information which relates one of said telephone agents to a business value datum corresponding to one or more data entry operations performed by said one telephone agent;

(2) storing said plurality of business value records in said first computer;

(3) retrieving one or more of said stored business value records;

(4) transmitting said retrieved business value records from said first computer to said second computer over a link;

(5) receiving in said first computer, from said CBX, a plurality of telephone call events each relating to a telephone call handled by one or more of said plurality of telephone agents; and (6) storing said plurality of telephone call events in said first computer.

2. The method of claim 1, further comprising the steps of:

(7) consolidating a plurality of said telephone call events into a call segment record relating to one of said telephone agents; and (8) transmitting said call segment record from said first computer to said second computer over said link.

3. The method of claim 1, further comprising the steps of:

(7) receiving at said second computer said transmitted business value records;

(8) storing said received business value records into said database on said second computer;

(9) reading a plurality of said stored business value records from said database on said second computer;

(10) accumulating a plurality of business values extracted from said plurality of business value records read from said database into an accumulated value; and

(11) generating a report comprising said accumulated value.

4. The method of claim 1, wherein step (1) comprises the step of generating a business value record which includes a monetary total as the business value datum.

5. Apparatus for exchanging telephone call information between a first computer and a second computer, said first computer coupled to a computerized branch exchange (CBX) which services a plurality of telephone agents, said second computer comprising a database, the apparatus comprising:

means for generating in conjunction with a data entry program on said first computer a plurality of business value records each comprising information which relates one of said telephone agents to a business value datum corresponding to one or more data entry operations performed by said one telephone agent;

means for storing said plurality of business value records in said first computer;

means for retrieving one or more of said stored business value records;

means for transmitting said retrieved business value records from said first computer to said second computer over a link;

means for receiving in said first computer, from said CBX, a plurality of telephone call events each relating to a telephone call handled by one or more of said plurality of telephone agents; and means for storing said plurality of telephone call events in said first computer.

6. The apparatus of claim 5, further comprising:

means for consolidating a plurality of said telephone call events into a call segment record relating to one of said telephone agents; and means for transmitting said call segment record from said first computer to said second computer over said link.

7. The apparatus of claim 5, further comprising:
means for receiving at said second computer said transmitted business value records;
means for storing business value records received at said second computer into said database on said second computer;
means for reading a plurality of said stored business value records from said database on said second computer;
means for accumulating a plurality of business values extracted from said plurality of business value records read from said database into an accumulated value; and
means for generating a report comprising said accumulated value.

8. The apparatus of claim 5, wherein said business value record includes a monetary total as the business value datum.

9. Apparatus for exchanging telephone call information between a first computer and a second computer, said first computer coupled to a computerized branch exchange (CBX) which services a plurality of telephone agents, said second computer comprising a database, the apparatus comprising:
a business event handler, coupled to a data entry program on said first computer, said business event handler generating a plurality of business value records each comprising information which relates one of said telephone agents to a business value datum corresponding to one or more data entry operations performed by said one telephone agent;
an event log for storing said plurality of business value records in said first computer;
a business event retrieval function for retrieving one or more of said stored business value records from said event log;
a data interface for transmitting said retrieved business value records from said first computer to said second computer over a link; and
a call event handler for receiving and storing into said event log a plurality of telephone call events from said CBX, each call event relating to a telephone call handled by one or more of-said plurality of telephone agents.

10. The apparatus of claim 9, further comprising:
a call segment generator, coupled to said event log, for consolidating a plurality of said telephone call events into a call segment record relating to one of said telephone agents and transmitting said call segment record through said data interface to said second computer.

11. Apparatus for accumulating business value records transmitted from a computer coupled to a CBX which services a plurality of telephone agents, said apparatus comprising:
a data interface for receiving, from said computer, a plurality of business value records each comprising information which relates one of said telephone agents to a business value datum corresponding to one or more data entry operations performed by said one telephone agent on said computer and for receiving, from said computer, a call segment record, the call segment record being a consolidation of a plurality of telephone call events relating to said one of telephone agents;
a business value accumulator for storing business value records received by said data interface into said database on said second computer;
a time-based accumulator for reading a plurality of said stored business value records from said database and accumulating a plurality of business values extracted therefrom into an accumulated business value; and
a report generator for generating a report comprising said accumulated business value.

12. The apparatus of claim 11, wherein said business value record includes a monetary total as the business value datum.

13. The apparatus of claim 11, wherein said time-based accumulator generates a plurality of business accumulation values and stores records corresponding thereto into said database.

14. The apparatus of claim 11, wherein said report generator formats said report in accordance with a user-defined report template.

15. The apparatus of claim 11,
wherein said data interface further receives from said computer a plurality of account code records each comprising information which relates said one telephone agent to an account code datum indicating the nature of a telephone call,
wherein said business value accumulator stores said plurality of account code records into said database,
wherein said time-based accumulator further reads a plurality of said stored account code records from said database and accumulates a plurality of account code values extracted therefrom into an accumulated account code value, and
wherein said report generator generates a report comprising said accumulated account code value.

16. Apparatus for accumulating telephone call information from a first computer coupled to a computerized branch exchange (CBX) which services a plurality of telephone agents, comprising:
means for receiving from said first computer a plurality of business value records each comprising information which relates one of said telephone agents to a business value datum corresponding to one or more data entry operations performed by said one telephone agent;
means for accumulating a plurality of business values extracted from said-business value records into an accumulated business value record and storing said accumulated business value record into a database;
means for retrieving a plurality of accumulated business value records from said database and extracting accumulated business values therefrom;
time accumulating means for accumulating, in accordance with a fixed time interval, a plurality of said accumulated business values extracted from said business value records into a time accumulated record and storing said time accumulated record into said database;
organizational accumulating means for accumulating, in accordance with an organizational hierarchy, said plurality of said accumulated business values extracted from said business value records into an organizational accumulated record and storing said organizational accumulated record into said database; and
said receiving means comprising means for receiving from said first computer a plurality of call segment records each comprising information relating to a telephone call segment attributable to one of said telephone agents.

17. The apparatus of claim 16, further comprising means for generating a formatted report comprising information from said time accumulated record.

18. A method of exchanging telephone call information between a first computer and a second computer, said first computer coupled to a computerized branch exchange (CBX) which services a plurality of telephone agents, said second computer comprising a database, the method comprising the steps of:

(1) generating in conjunction with a data entry program on said first computer a plurality of business value records each comprising information which relates one of said telephone agents to a business value datum corresponding to one or more data entry operations performed by said one telephone agent;

(2) storing said plurality of business value records in said first computer;

(3) retrieving one or more of said stored business value records;

(4) transmitting said retrieved business value records from said first computer to said second computer over a link;

(5) receiving at said second computer said transmitted business value records;

(6) storing said received business value records into said database on said second computer;

(7) reading a plurality of said stored business value records from said database on said second computer;

(8) accumulating a plurality of business values extracted from said plurality of business value records read from said database into an accumulated value, including
accumulating a plurality of business values extracted from said plurality of business value records read from said database into a first accumulated value according to a first fixed time interval and storing said first accumulated value into said database, and
accumulating said plurality of business values extracted from said plurality of business value records read from said database into a second accumulated value according to a second fixed time interval different from said first fixed time interval and storing said second accumulated value into said database; and (9) generating a report comprising said accumulated value.

19. A method of exchanging telephone call information between a first computer and a second computer, said first computer coupled to a computerized branch exchange (CBX) which services a plurality of telephone agents, said second computer comprising a database, the method comprising the steps of:

(1) generating in conjunction with a data entry program on said first computer a plurality of business value records each comprising information which relates one of said telephone agents to a business value datum corresponding to one or more data entry operations performed by said one telephone agent;

(2) storing said plurality of business value records in said first computer;

(3) retrieving one or more of said stored business value records;

(4) transmitting said retrieved business value records from said first computer to said second computer over a link;

(5) receiving at said second computer said transmitted business value records;

(6) storing said received business value records into said database on said second computer;

(7) reading a plurality of said stored business value records from said database on said second computer;

(8) accumulating a plurality of business values extracted from said plurality of business value records read from said database into an accumulated value, including
providing an organizational hierarchy comprising at least two levels each of which defines an accumulation level over which business values will be accumulated;
accumulating a plurality of business values extracted from said plurality of business value records read from said database into a first accumulated value according to a first level of said organizational hierarchy and storing said first accumulated value into said database, and
accumulating said plurality of business values extracted from said plurality of business value records read from said database into a second accumulated value according to a second level of said organizational hierarchy and storing said second accumulated value into said database; and (9) generating a report comprising said accumulated value.

20. A method of exchanging telephone call information between a first computer and a second computer, said first computer coupled to a computerized branch exchange (CBX) which services a plurality of telephone agents, said second computer comprising a database, the method comprising the steps of:

(1) generating in conjunction with a data entry program on said first computer a plurality of business value records each comprising information which relates one of said telephone agents to a business value datum corresponding to one or more data entry operations performed by said one telephone agent;

(2) storing said plurality of business value records in said first computer;

(3) retrieving one or more of said stored business value records;

(4) transmitting said retrieved business value records from said first computer to said second computer over a link;

(5) receiving at said second computer said transmitted business value records;

(6) storing said received business value records into said database on said second computer;

(7) reading a plurality of said stored business value records from said database on said second computer;

(8) accumulating a plurality of business values extracted from said plurality of business value records read from said database into a first accumulated value according to a fixed time interval and storing said first accumulated value into said database; and (9) accumulating said plurality of business values extracted from said plurality of business value records read from said database into a second accumulated value according to an organizational hierarchy and storing said second accumulated value into said database.

21. The method of claim 20, further comprising the steps of repeating steps (5) through (9) a plurality of times and generating therefrom a first plurality of accumulated values and a second plurality of accumulated values.

22. The method of claim 21, further comprising the step of generating a formatted report from said second computer, said formatted report comprising said first and second plurality of accumulated values.

23. A method of exchanging telephone call information between a first computer and a second computer, said first computer coupled to a computerized branch exchange (CBX) which services a plurality of telephone agents, said second computer comprising a database, the method comprising the steps of:

(1) generating in conjunction with a data entry program on said first computer a plurality of business value records each comprising information which relates one of said telephone agents to a business value datum corresponding to one or more data entry operations performed by said one telephone agent;

(2) storing said plurality of business value records in said first computer;

(3) retrieving one or more of said stored business value records;

(4) transmitting said retrieved business value records from said first computer to said second computer over a link;

(5) generating in conjunction with said data entry program on said first computer a plurality of account code records each comprising information which relates said one telephone agent to an account code datum indicating the nature of one telephone call;

(6) storing said plurality of account code records in said first computer;

(7) retrieving said plurality of stored account code records; and (8) transmitting said retrieved account code records from said first computer to said second computer over said link.

24. The method of claim 23, further comprising the steps of:

(9) receiving at said second computer said transmitted account code records;

(10) storing said received account code records into said database on said second computer;

(11) reading a plurality of said stored account code records from said database on said second computer;

(12) accumulating a plurality of account code values extracted from said plurality of account code records read from said database into one or more accumulated account code values; and

(13) generating a report comprising said one or more accumulated account code values.

25. Apparatus for exchanging telephone call information between a first computer and a second computer, said first computer coupled to a computerized branch exchange (CBX) which services a plurality of telephone agents, said second computer comprising a database, the apparatus comprising:

means for generating in conjunction with a data entry program on said first computer a plurality of business value records each comprising information which relates one of said telephone agents to a business value datum corresponding to one or more data entry operations performed by said one telephone agent;

means for storing said plurality of business value records in said first computer;

means for retrieving one or more of said stored business value records;

means for transmitting said retrieved business value records from said first computer to said second computer over a link;

means for receiving at said second computer said transmitted business value records;

means for storing business value records received at said second computer into said database on said second computer;

means for reading a plurality of said stored business value records from said database on said second computer;

means for accumulating a plurality of business values extracted from said plurality of business value records read from said database into an accumulated value; and means for generating a report comprising said accumulated value;

wherein said accumulating means comprises:

means for accumulating a plurality of business values extracted from said plurality of business value records read from said database into a first accumulated value according to a first fixed time interval and storing said first accumulated value into said database; and means for accumulating said plurality of business values extracted from said plurality of business value records read from said database into a second accumulated value according to a second fixed time interval different from said first fixed time interval and storing said second accumulated value into said database.

26. Apparatus for exchanging telephone call information between a first computer and a second computer, said first computer coupled to a computerized branch exchange (CBX) which services a plurality of telephone agents, said second computer comprising a database, the apparatus comprising:

means for generating in conjunction with a data entry program on said first computer a plurality of business value records each comprising information which relates one of said telephone agents to a business value datum corresponding to one or more data entry operations performed by said one telephone agent;

means for storing said plurality of business value records in said first computer;

means for retrieving one or more of said stored business value records;

means for transmitting said retrieved business value records from said first computer to said second computer over a link;

means for receiving at said second computer said transmitted business value records;

means for storing business value records received at said second computer into said database on said second computer;

means for reading a plurality of said stored business value records from said database on said second computer;

means for accumulating a plurality of business values extracted from said plurality of business value records read from said database into an accumulated value; and means for generating a report comprising said accumulated value;

wherein said accumulating means comprises:

means for accumulating a plurality of business values extracted from said plurality of business value records read from said database into a first accumulated value according to a first level of an organizational hierarchy and storing said first accumulated value into said database, and means for accumulating said plurality of business values extracted from said plurality of business value records read from said database into a second accumulated value according to a second level of said organizational hierarchy and storing said second accumulated value into said database.

27. Apparatus for exchanging telephone call information between a first computer and a second computer, said first computer coupled to a computerized branch exchange (CBX) which services a plurality of telephone agents, said second computer comprising a database, the apparatus comprising:

means for generating in conjunction with a data entry program on said first computer a plurality of business value records each comprising information which relates one of said telephone agents to a business value datum corresponding to one or more data entry operations performed by said one telephone agent;

means for storing said plurality of business value records in said first computer;

means for retrieving one or more of said stored business value records;

means for transmitting said retrieved business value records from said first computer to said second computer over a link;

means for receiving at said second computer said transmitted business value records;

means for storing said received business value records into said database on said second computer;

means for reading a plurality of said stored business value records from said database on said second computer;

first means for accumulating a plurality of business values extracted from said plurality of business value records read from said database into a first accumulated value according to a fixed time interval and storing said first accumulated value into said database; and second means for accumulating said plurality of business values extracted from said plurality of business value records read from said database into a second accumulated value according to an organizational hierarchy and storing said second accumulated value into said database.

28. The apparatus of claim 27, wherein said first means for accumulating accumulates and stores a first plurality of accumulated values, and wherein said second means for accumulating accumulates and stores a second plurality of accumulated values.

29. The apparatus of claim 28, further comprising means for generating a formatted report from said second computer, said formatted report comprising said first and second plurality of accumulated values.

30. Apparatus for exchanging telephone call information between a first computer and a second computer, said first computer coupled to a computerized branch exchange (CBX) which services a plurality of telephone agents, said second computer comprising a database, the apparatus comprising:

means for generating in conjunction with a data entry program on said first computer a plurality of business value records each comprising information which relates one of said telephone agents to a business value datum corresponding to one or more data entry operations performed by said one telephone agent;

means for storing said plurality of business value records in said first computer;

means for retrieving one or more of said stored business value records;

means for transmitting said retrieved business value records from said first computer to said second computer over a link;

means for generating on said first computer a plurality of account code records each comprising information which relates said one telephone agent to an account code datum indicating the nature of a telephone call;

means for storing said plurality of account code records in said first computer;

means for retrieving said plurality of stored account code records; and means for transmitting said retrieved account code records from said first computer to said second computer over said link.

31. The apparatus of claim 30, further comprising:

means for receiving at said second computer said transmitted account code records;

means for storing account code records received at said second computer into said database on said second computer;

means for reading a plurality of said stored account code records from said database on said second computer;

means for accumulating a plurality of account code values extracted from said plurality of account code records read from said database into one or more accumulated account code values; and means for generating a report comprising said one or more accumulated account code values.

32. Apparatus for accumulating business value records transmitted from a computer coupled to a CBX which services a plurality of telephone agents, said apparatus comprising:

a data interface for receiving, from said computer, a plurality of business value records each comprising information which relates one of said telephone agents to a business value datum corresponding to one or more data entry operations performed by said one telephone agent on said computer;

a business value accumulator for storing business value records received by said data interface into said database on said second computer;

a time-based accumulator for reading a plurality of said stored business value records from said database and accumulating a plurality of business values extracted therefrom into an accumulated business value; and a report generator for generating a report comprising said accumulated business value;

wherein said time-based accumulator accumulates said plurality of business values into a first accumulated business value according to a first fixed time interval and stores said first accumulated business value into said database, and further accumulates said plurality of business values into a second accumulated business value according to a second fixed time interval and stores said second accumulated business value into said database.

33. Apparatus for accumulating business value records transmitted from a computer coupled to a CBX which services a plurality of telephone agents, said apparatus comprising:

a data interface for receiving, from said computer, a plurality of business value records each comprising information which relates one of said telephone agents to a business value datum corresponding to one or more data entry operations performed by said one telephone agent on said computer;

a business value accumulator for storing business value records received by said data interface into said database on said second computer;

a time-based accumulator for reading a plurality of said stored business value records from said database and accumulating a plurality of business values extracted therefrom into an accumulated business value;

a report generator for generating a report comprising said accumulated business value; and an organization accumulator for accumulating a plurality of business values extracted from said plurality of business value records read from said database into a first accumulated value according to a first level of an organizational hierarchy and storing said first accumulated value into said database, and for accumulating said plurality of business values extracted from said plurality of business value records read from said database into a second accumulated value according to a second level of said organizational hierarchy and storing said second accumulated value into said database.

34. Apparatus for accumulating telephone call information from a first computer coupled to a computerized branch exchange (CBX) which services a plurality of telephone agents, comprising:

means for receiving from said first computer a plurality of business value records each comprising information which relates one of said telephone agents to a business value datum corresponding to one or more data entry operations performed by said one telephone agent;

means for accumulating a plurality of business values extracted from said-business value records into an accumulated business value record and storing said accumulated business value record into a database;

means for retrieving a plurality of accumulated business value records from said database and extracting accumulated business values therefrom;

time accumulating means for accumulating, in accordance with a fixed time interval, a plurality of said accumulated business values extracted from said business value records into a time accumulated record and storing said time accumulated record into said database; and organizational accumulating means for accumulating, in accordance with an organizational hierarchy, said plurality of said accumulated business values extracted from said business value records into an organizational accumulated record and storing said organizational accumulated record into said database;

wherein said receiving means comprises means for receiving from said first computer a plurality of account code records each comprising information which relates said one telephone agent to an account code datum indicating the nature of a telephone call;

wherein said accumulating means comprises means for accumulating a plurality of account code values extracted from said account code records into an accumulated account code record and storing said accumulated account code record into said database;

wherein said retrieving means comprises means for retrieving a plurality of accumulated account code records from said database and extracting accumulated account code values therefrom;

wherein said time accumulating means comprises means for accumulating, in accordance with said fixed time interval, a plurality of accumulated account code values extracted from said account code records into said time accumulated record; and wherein said organizational accumulating means comprises means for accumulating, in accordance with said organizational hierarchy, said plurality of accumulated account code values extracted from said account code records into said organizational accumulated record into said database.

35. Apparatus for accumulating telephone call information from a first computer coupled to a computerized branch exchange (CBX) which services a plurality of telephone agents, comprising:

means for receiving from said first computer a plurality of business value records each comprising information which relates one of said telephone agents to a business value datum corresponding to one or more data entry operations performed by said one telephone agent, said receiving means comprising means for receiving from said first computer a plurality of call segment records each comprising information relating to a telephone call segment attributable to one of said telephone agents;

means for accumulating a plurality of business values extracted from said-business value records into an accumulated business value record and storing said accumulated business value record into a database;

means for retrieving a plurality of accumulated business value records from said database and extracting accumulated business values therefrom;

time accumulating means for accumulating, in accordance with a fixed time interval, a plurality of said accumulated business values extracted from said business value records into a time accumulated record and storing said time accumulated record into said database;

organizational accumulating means for accumulating, in accordance with an organizational hierarchy, said plurality of said accumulated business values extracted from said business value records into an organizational accumulated record and storing said organizational accumulated record into said database; and means for storing received call segment records into said database, and means for tracing a telephone call by linking a plurality of said call segment records from said database having a common call identifier.

* * * * *